US008054516B2

(12) United States Patent
Kuroda

(10) Patent No.: US 8,054,516 B2
(45) Date of Patent: Nov. 8, 2011

(54) DEVICE FOR SCANNING AND VERIFYING A PLURALITY OF PAPER FINGERPRINTS

(75) Inventor: Yuji Kuroda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 551 days.

(21) Appl. No.: 12/211,394

(22) Filed: Sep. 16, 2008

(65) Prior Publication Data

US 2009/0073517 A1 Mar. 19, 2009

(30) Foreign Application Priority Data

Sep. 19, 2007 (JP) ................................. 2007-242668

(51) Int. Cl.
*H04N 1/46* (2006.01)
*H04N 1/04* (2006.01)

(52) U.S. Cl. ........................................ 358/505; 358/474

(58) Field of Classification Search .......... 382/318–319; 358/402, 488, 1.14, 505, 474; 283/68–69, 283/78
See application file for complete search history.

(56) References Cited

U.S. PATENT DOCUMENTS 4,491,960 A * 1/1985 Brown .......................... 382/204
4,958,235 A * 9/1990 Sims et al. .................... 358/402
5,119,213 A * 6/1992 Graves et al. ................. 358/488
5,327,205 A * 7/1994 Baba ............................. 399/370
6,574,631 B1 * 6/2003 Subramanian et al. ............... 1/1
6,876,757 B2 * 4/2005 Yau et al. ...................... 382/125
6,942,308 B2 * 9/2005 Molinet et al. .................... 347/4
7,190,470 B2 * 3/2007 Burquist et al. ............. 358/1.14
7,627,161 B2 * 12/2009 Shimizu et al. ............... 382/135
7,809,156 B2 * 10/2010 Piersol et al. ................ 382/100
7,865,124 B2 * 1/2011 Piersol et al. ................. 399/361
2005/0139527 A1 * 6/2005 Van Nice et al. ............. 209/599
2005/0273865 A1 * 12/2005 Slijp et al. ....................... 726/28

FOREIGN PATENT DOCUMENTS

JP 7-110641 4/1995
JP 2005-38389 2/2005

* cited by examiner

*Primary Examiner* — Douglas Tran
(74) *Attorney, Agent, or Firm* — Fitzpatrick, Cella, Harper & Scinto

(57) ABSTRACT

A document scanning device is provided that is able to accurately and easily scan paper fingerprint information, even if particulate rubbish such as paper powder or dust is adhering to the surface of a document platen glass. In an image scanning device able to scan using both a stationary document scanning method as well as document feed scanning method, paper fingerprint information is scanned using either of the above methods. Subsequently, a conveying unit and a scanning unit are moved so as to re-scan the paper fingerprint information in the same fingerprint acquisition region. The above operation is repeated until both sets of paper fingerprint information are coincident.

23 Claims, 23 Drawing Sheets

HOW TO SOLVE FOR
E(-n+1,-m+2)

HOW TO SOLVE FOR
E(n+1,-m+2)

HOW TO SOLVE FOR E(0,0)

HOW TO SOLVE FOR E(n-1,m-1)

DEVICE FOR SCANNING AND VERIFYING A PLURALITY OF PAPER FINGERPRINTS

BACKGROUND OF THE INVENTION

1. Field of the Invention

The present invention relates to an image scanning device able to handle paper fingerprint information.

2. Description of the Related Art

In recent years, digitalization is progressing due to the prevalence of technologies such as the Internet. Since a variety of information can now be readily acquired, it is essential for security technology to prevent information leakage and unauthorized use on information processing equipment.

In image processing devices such as photocopiers and Multifunction Peripherals, several technologies for guaranteeing that a document is the original are adopted as such security technology. One of these security technologies uses paper fingerprint information. Paper is made up of tangled plant fibers approximately 20 to 30 microns thick, and random patterns are created as a result of such tangling. These random patterns are called paper fingerprints, and like human fingerprints they differ for every single sheet of paper. Consequently, the authenticity of an original can be guaranteed by acquiring (i.e., registering) and verifying the paper fingerprint information thereof. The paper fingerprint information is acquired using an optical image scanning device housed inside an image processing device. The paper fingerprint information acquired by the scanning device is a shadow pattern of the plant fibers from a white region of the paper. In order to acquire the shadow pattern, the amount of light used to illuminate the document sheet when acquiring the paper fingerprint information must be less than (i.e., darker than) the amount of light used when performing regular image scanning. Thus, the gain adjustment values with respect to the image signal acquired when scanning paper fingerprint information are configured to be smaller than the gain adjustment values used when performing regular image scanning.

Meanwhile, scanning devices have been proposed wherein it is possible to use both a stationary document scanning method and a document feed scanning method (see Japanese Patent Laid-Open No. H07-110641, for example). The stationary document scanning method involves conveying and then stopping a document sheet on top of a document platen glass for documents, and subsequently causing an optical unit to be moved and scan an image. In contrast, the document feed scanning method involves holding the optical unit in place and scanning an image while conveying the document sheet. In an image scanning device wherein it is possible to use both the stationary document scanning method and the document feed scanning method, the user is able to select either of the document scanning methods by operating an operation unit of the image scanning device. In the case of the stationary document scanning method, in order to scan an image of the next document sheet after causing the optical unit to be moved and scan an image, the user must again return the optical unit to its original position. In contrast, in the case of the document feed scanning method, it is not necessary to return the optical unit to its original position because an image is scanned while conveying a document sheet, and thus the document scanning time can be shortened.

When scanning paper fingerprint information using the scanning device described above, the paper fingerprint information cannot be accurately scanned if rubbish or other material is adhering to the paper fingerprint information scanning region of the glass surface of the document platen upon which a paper sheet is placed. When scanning paper fingerprint information, the document sheet is illuminated with an amount of light that is less than (i.e., darker than) the amount of light used when performing regular image scanning. Consequently, it may become impossible to accurately scan paper fingerprint information due to the effects of tiny scratches on the surface of the glass plate or particles such as paper powder or dust adhering to the surface of the glass plate, even if the degree of such scratches or particles does not pose a problem during regular image copying. One method of coping with this problem is given in Japanese Patent Laid-Open No. 2005-038389, for example, which discloses a method for accurately scanning paper fingerprint information by scanning paper fingerprint information multiple times at different regions of the document platen, and then performing image processing (rotational and arithmetic processing) on the plurality of scanned data.

However, in the method disclosed in Japanese Patent Laid-Open No. 2005-038389, the user must place the document on the document platen oriented in a variety of angles (such as 0°, 90°, 180°, and 270°) in order to scan the paper fingerprint information at different regions of the document plate. For this reason, a large burden is placed on the user. Furthermore, device costs increase due to the need to provide functions in the scanning device for executing complex processing such as rotational processing and arithmetic processing.

SUMMARY OF THE INVENTION

The present invention has an object to provide an image scanning device able to scan paper fingerprint information accurately and easily, even if particulate rubbish such as paper powder or dust is adhering to the surface of the glass plate.

An image scanning device in accordance with the present invention is provided with a conveying unit, a scanning unit, a comparing unit, and an acquiring unit. The conveying unit conveys a document sheet placed on a document placing platen to a plurality of locations. The scanning unit scans paper fingerprint information on the document sheet. The comparing unit compares a first set of paper fingerprint information, which is scanned by the scanning unit while holding the document sheet in place at a first location, with a second set of paper fingerprint information, which is scanned by the scanning unit while holding the document sheet in place at a second location. The acquiring unit acquires the paper fingerprint information when the comparing unit detects that the first set of paper fingerprint information is coincident with the second set of paper fingerprint information.

An image scanning device in accordance with another embodiment of the present invention is provided with a conveying unit, a movable scanning unit, a comparing unit, and an acquiring unit. The conveying unit conveys a document sheet placed on a document placing platen to a plurality of locations. The movable scanning unit scans paper fingerprint information on the document sheet. The comparing unit compares a first set of paper fingerprint information, which is scanned by moving the document sheet while holding the scanning unit in place at a first location, with a second set of paper fingerprint information, which is scanned by moving the document sheet while holding the scanning unit in place at a second location. The acquiring unit acquires the paper fingerprint information when the comparing unit detects that the first set of paper fingerprint information is coincident with the second set of paper fingerprint information.

An image scanning device in accordance with another embodiment of the present invention is provided with a conveying unit, a movable scanning unit, a first comparing unit, a second comparing unit, and an acquiring unit. The conveying unit conveys a document sheet placed on a document placing platen to a plurality of locations. The movable scanning unit scans paper fingerprint information on the document sheet. The first comparing unit compares a first set of paper fingerprint information, which is scanned by moving the movable scanning unit while holding the document sheet in place at a first location, with a second set of paper fingerprint information, which is scanned by moving the movable scanning unit while holding the document sheet in place at a second location. The second comparing unit compares a third set of paper fingerprint information, which is scanned by moving the document sheet while holding the movable scanning unit in place at a third location, with a fourth set of paper fingerprint information, which is scanned by moving the document sheet while holding the movable scanning unit in place at a fourth location. The acquiring unit acquires the paper fingerprint information when either the first comparing unit detects that the first set of paper fingerprint information is coincident with the second set of paper fingerprint information, or the second comparing unit detects that the third set of paper fingerprint information is coincident with the fourth set of paper fingerprint information.

An image scanning method in accordance with the present invention includes a conveying step, a scanning step, a comparing step, and an acquiring step. In the conveying step, a conveying unit conveys a document sheet placed on a document placing platen to a plurality of locations. In the scanning step, a movable scanning unit scans paper fingerprint information on the document sheet. In the comparing step, a comparing unit compares a first set of paper fingerprint information, which is scanned by the movable scanning unit while holding the document sheet in place at a first location, with a second set of paper fingerprint information, which is scanned by the movable scanning unit while holding the document sheet in place at a second location. In the acquiring step, an acquiring unit acquires the paper fingerprint information when the comparison result indicates that the first set of paper fingerprint information is coincident with the second set of paper fingerprint information.

An image scanning method in accordance with the present invention includes a conveying step, a scanning step, a comparing step, and acquiring step. In the conveying step, a conveying unit conveys a document sheet placed on a document placing platen to a plurality of locations. In the scanning step, a scanning unit scans the paper fingerprint information of the document sheet. In the comparing step, a comparing unit compares a first set of paper fingerprint information, which is scanned by moving the document sheet while holding the movable scanning unit in place at a first location, with a second set of paper fingerprint information, which is scanned by moving the document sheet while holding the movable scanning unit in place at a second location. In the acquiring step, an acquiring unit acquires the paper fingerprint information when the comparison result indicates that the first set of paper fingerprint information is coincident with the second set of paper fingerprint information.

An image scanning method in accordance with the present invention includes a conveying step, a scanning step, a first comparing step, a second comparing step, and an acquiring step. In the conveying step, a conveying unit conveys a document sheet placed on a document placing platen to a plurality of locations. In the scanning step, a movable scanning unit scans paper fingerprint information on the document sheet. In the first comparing step, a comparing unit compares a first set of paper fingerprint information, which is scanned by moving the movable scanning unit while holding the document sheet in place at a first location, with a second set of paper fingerprint information, which is scanned by moving the movable scanning unit while holding the document sheet in place at a second location. In the second comparing step, a second comparing unit compares a third set of paper fingerprint information, which is scanned by moving the document sheet while holding the movable scanning unit in place at a third location, with a fourth set of paper fingerprint information, which is scanned by moving the document sheet while holding the movable scanning unit in place at a fourth location. In the acquiring step, an acquiring unit acquires the paper fingerprint information when either the first comparison result indicates that the first set of paper fingerprint information is coincident with the second set of paper fingerprint information, or the second comparison result indicates that the third set of paper fingerprint information is coincident with the fourth set of paper fingerprint information.

A computer-readable recording medium in accordance with the present invention stores a program that causes the method described above to be executed on a computer.

In the present invention, after scanning a first set of paper fingerprint information using either the stationary document scanning method or the document feed scanning method, the paper sheet conveying unit or the optical unit is moved, and a second set of paper fingerprint information is scanned again from the same paper fingerprint information acquisition region. Subsequently, the two sets of paper fingerprint information are compared, and when the first set of paper fingerprint information is coincident with the second set of paper fingerprint information, that paper fingerprint information is acquired. In so doing, the burden on the user required for paper fingerprint information acquisition is lessened, and in addition, paper fingerprint information can be accurately acquired.

Further features of the present invention will become apparent from the following description of exemplary embodiments (with reference to the attached drawings).

DESCRIPTION OF THE EMBODIMENTS

Hereinafter, preferred embodiments of the invention will be described in detail with reference to the accompanying drawings. However, it should be appreciated that the elements described for the following embodiments are given only by way of example, and are not intended to limit the scope of the invention.

Figure 1:
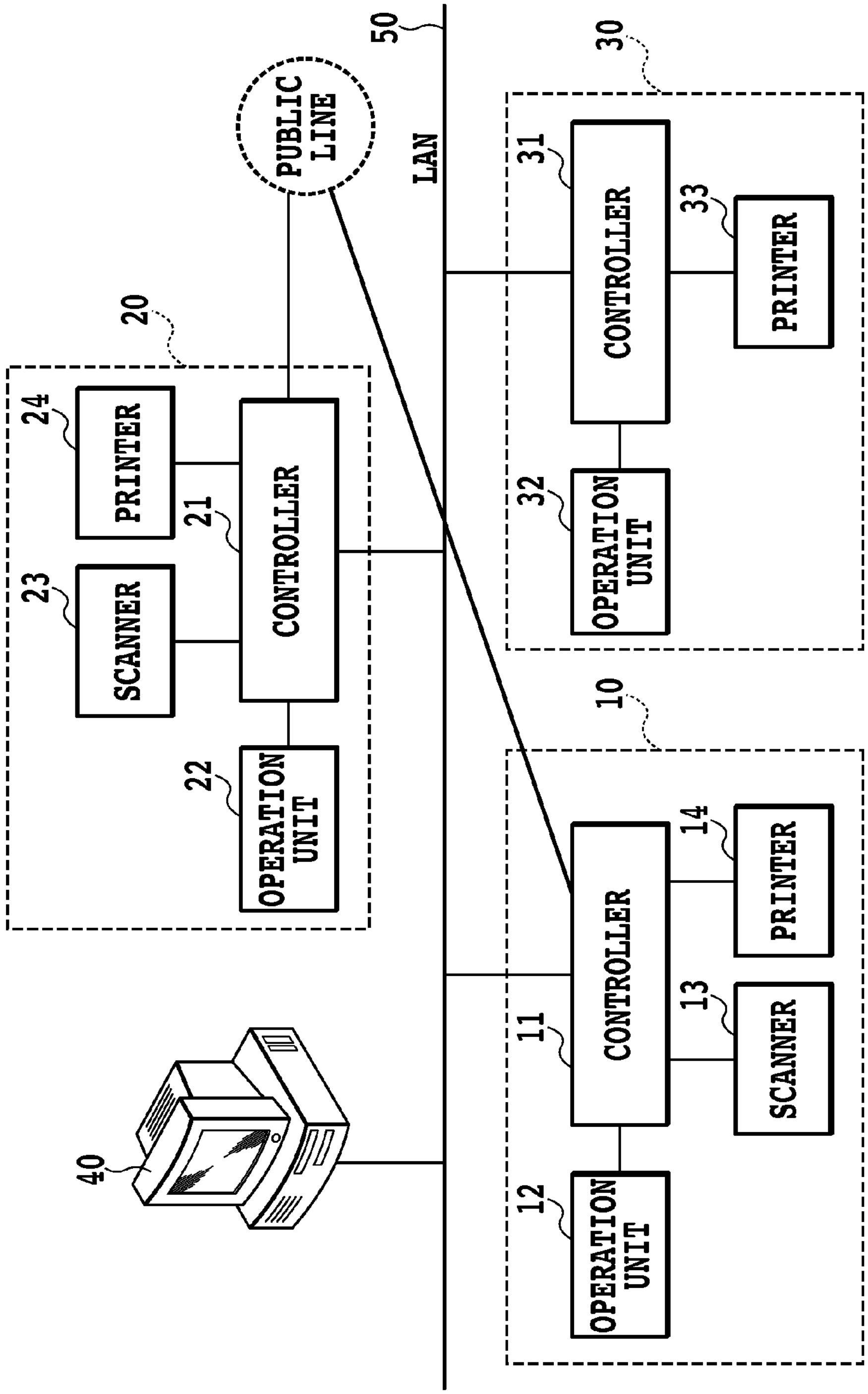
FIG. 1 is a block diagram showing the configuration of a printing system.

FIG. 1 is a block diagram showing the configuration of a printing system in accordance with an embodiment of the present invention.

In the system shown in FIG. 1, a host computer 40 and three image forming devices (10, 20, and 30) are connected to a LAN (local area network) 50. However, the above configuration is given by way of example, and the number of device connections is not limited to the above-number of devices. Furthermore, while the respective devices are connected via a LAN in the present embodiment, the invention is not limited thereto. For example, it is also possible to apply an arbitrary network such as a WAN (wide area network), a serial transmission method such as USB (universal serial bus), or a parallel transmission method such as Centronix or SCSI (small computer system interface).

The host computer (hereinafter abbreviated as PC) 40 has the functions of a personal computer. The PC 40 is able to send and receive files and email using protocols such as FTP (file transfer protocol) and SMB (server message block) via the LAN 50 and a WAN. The PC 40 is also able to send print commands to the image forming devices 10, 20, and 30 via printer drivers.

The image forming device 10 is provided with a controller 11, an operation unit 12, a scanner 13, and a printer 14. The image forming device 20 is provided with a controller 21, an operation unit 22, a scanner 23, and a printer 24. The image forming device 30 is provided with a controller 31, an operation unit 32, and a printer 33. The configuration of the image forming device 30 differs from that of the image forming device 10 and the image forming device 20 in that the image forming device 30 is not provided with a scanner.

For the sake of convenience in the following explanation, the image forming device 10 will be taken as a representative example and its configuration will be described in detail.

The image forming device 10 includes a scanner 13 that functions as an image input device, a printer 14 that functions as an image output device, a controller 11 that performs overall operational control of the image forming device 10, and an operation unit 12 that provides a user interface (UI) screen.

Figure 2:
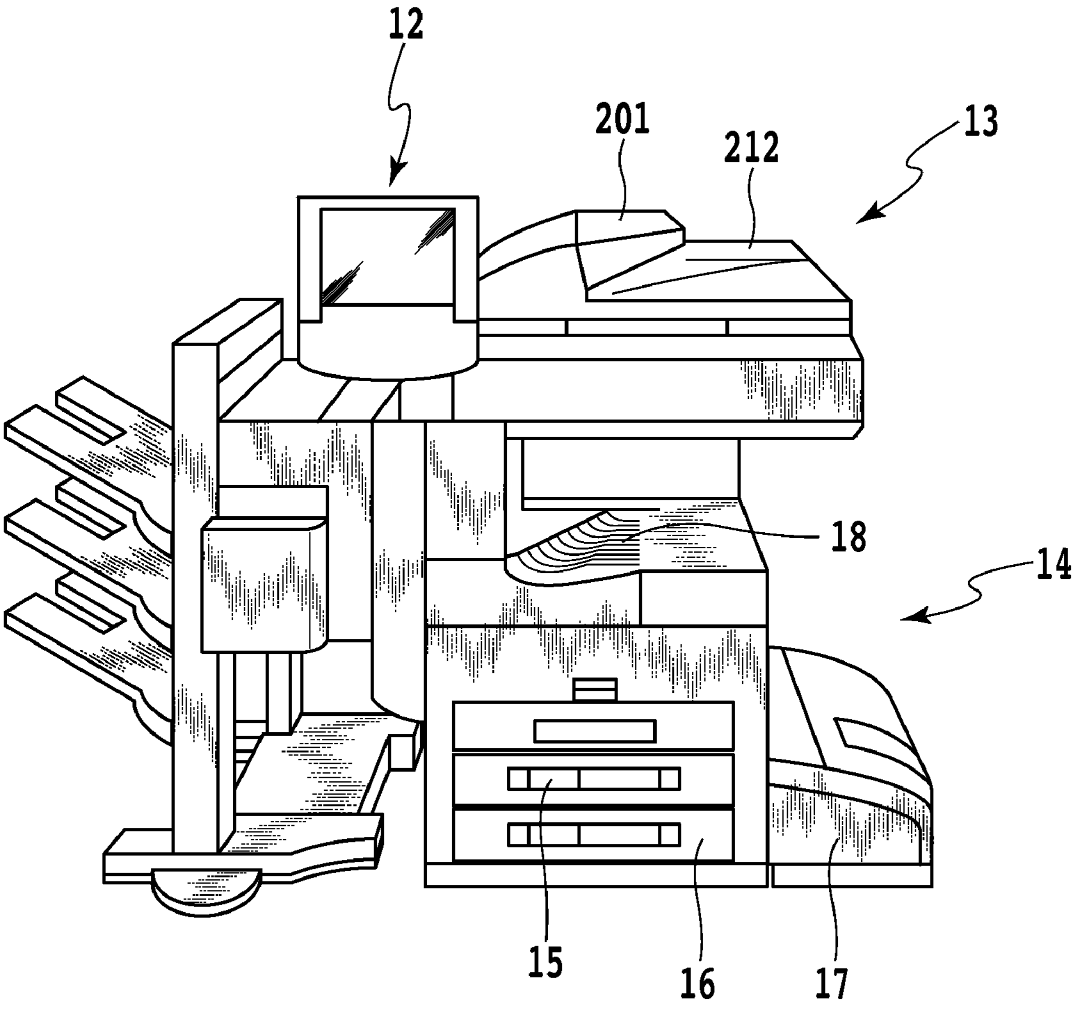
FIG. 2 is a diagram illustrating the appearance of an image forming device.

FIG. 2 is a diagram showing the appearance of the image forming device 10.

As described above, the image forming device 10 is provided with an operation unit 12, a scanner 13, and a printer 14.

The scanner 13 is provided with a paper sheet conveying unit 201 and an optical unit 212. If the sensitivity of the optical unit 212 is not uniform, then the optical unit 212 will recognize different intensities for each pixel, even if the intensity of each pixel is the same on the document. For this reason, the scanner 13 first performs a scanning exposure of a white board (i.e., a uniformly white board), converts the quantities of reflected light obtained from the scanning exposure into an electrical signal, and then outputs the electrical signal to the controller 11. As described later, a shading correction unit within the controller 11 recognizes the sensitivity differences in the optical unit 212 on the basis of the electrical signal obtained from the scanner 13. Subsequently, the shading correction unit uses these sensitivity differences to correct values in an electrical signal obtained by scanning an image on a document. Furthermore, upon receiving gain adjustment information from a CPU (central processing unit) within the controller 11 as described later, the shading correction unit performs gain adjustment according to the information. Gain adjustment is used to adjust how the values in an electrical signal obtained by performing a scanning exposure of a document are distributed among luminance signal values ranging from 0 to 255. As a result of such gain adjustment, the values in an electrical signal obtained by performing a scanning exposure of a document can be converted into high or low luminance signal values.

The operation whereby an image on a document is scanned will now be described.

A document is first placed on a tray of the paper sheet conveying unit 201. When a user issues instructions to start scanning from the operation unit 12, the controller sends instructions for scanning the document to the scanner 13. Upon receiving these instructions, the scanner 13 separates and conveys one page of the document at a time from the tray of the paper sheet conveying unit 201 and performs operations to scan the document.

The scanner 13 converts image information into an electrical signal by inputting reflected light obtained by performing a scanning exposure of an image on the document into the optical unit. In addition, the scanner 13 converts the electrical signal into a luminance signal made up of the respective colors R, G, and B, and then outputs the luminance signal to the controller 11 as image data.

The printer 14 is an image forming device that forms image data acquired from the controller 11 upon a paper sheet. It should be appreciated that while the image forming method in the present embodiment is an electrophotographic method using a photoreceptor drum or photoreceptor belt, the invention is not limited thereto. For example, it is also possible to apply an inkjet method as the image forming method, wherein ink is ejected from a microscopic nozzle array onto a paper sheet. In addition, the printer 14 is also provided with a plurality of paper cassettes 15, 16, and 17 enabling the selection of different paper sizes or different paper orientations. Printed paper sheets are ejected into a catch tray 18.

Figure 3:
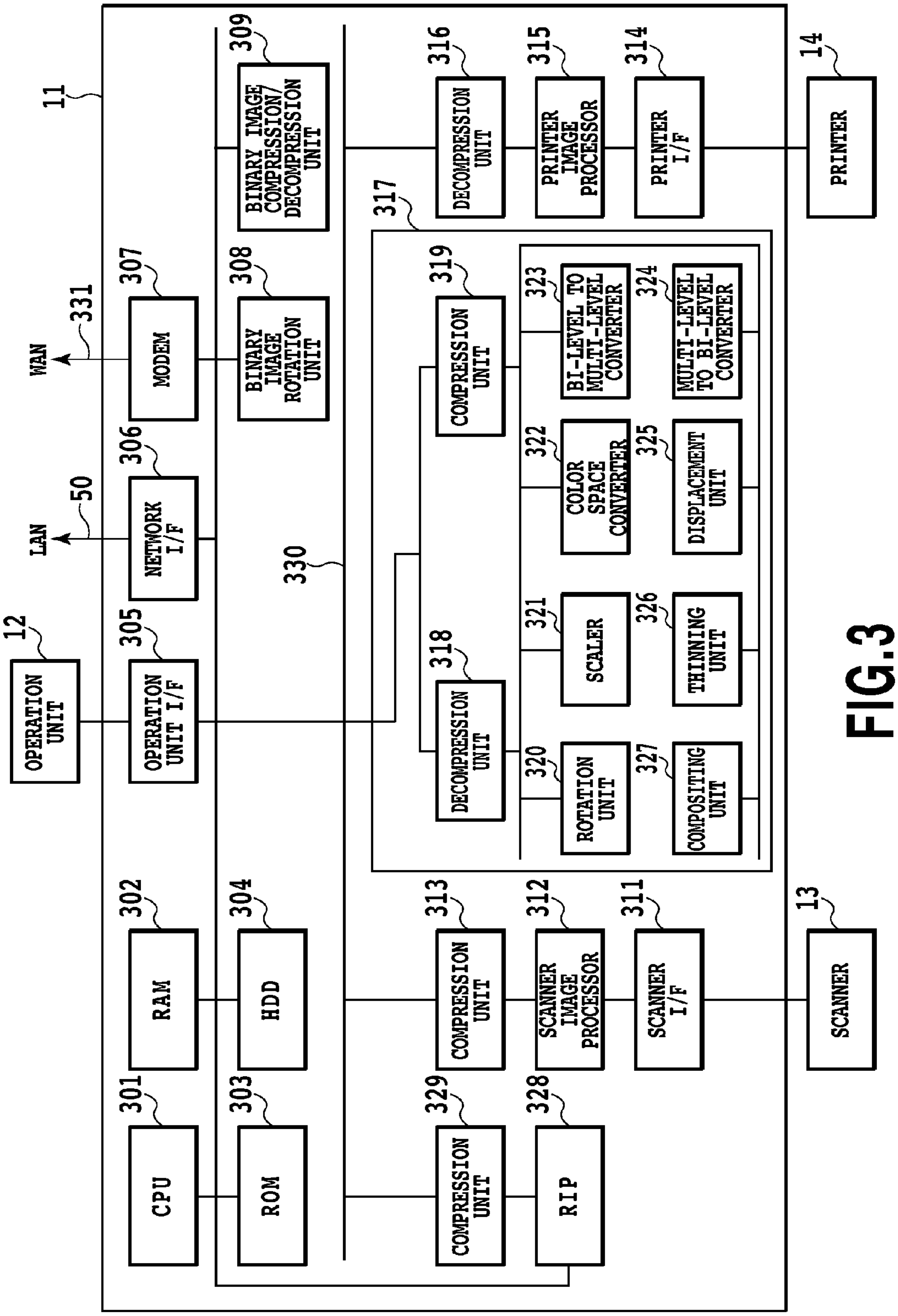
FIG. 3 is a block diagram showing an exemplary configuration of a controller for an image forming device.

FIG. 3 is a block diagram showing an exemplary configuration of the controller 11 of the image forming device 10.

The controller 11 is connected to the scanner 13 and the printer 14, while being additionally connected to the PC 40 or other external device via the LAN 50 and a WAN 331.

The CPU 301 controls various connected devices on the basis of a control program or similar information stored in the ROM 303, while additionally controlling the various processing operation performed within the controller 11. The RAM (random access memory) 302 is a system work memory used by the CPU 301, as well as a memory for temporarily storing image data. The ROM (read only memory) 303 stores a boot program or similar information for the image forming device 10. The HDD 304 is a hard disk drive and stores information such as system software and image data.

The operation unit I/F 305 is an interface for connecting a system bus 310 with the operation unit 12. The operation unit I/F 305 receives image data to be displayed on the operation unit 12 from the system bus 310 and outputs the image data to the operation unit 12, while additionally outputting information input from the operation unit 12 to the system bus 310.

The network I/F 306 connects the LAN 50 with the system bus 310. A modem 307 connects the WAN 331 with the system bus 310.

A binary image rotation unit 308 changes the orientation of image data before transmission. A binary image compression/decompression unit 309 converts the resolution of the image data before transmission to a predetermined resolution or to a resolution that matches the capability of the transmission destination. Methods such as the JBIG (joint bi-level image experts group), MMR (modified modified READ (relative element address designate)), MR (modified READ), and MH (modified huffman) standards may be used for the compression and decompression.

The image bus 330 is a transmission path for transferring image data among respective units within the controller 11. The image bus 330 is a PCI or IEEE 1394 bus, for example.

The scanner image processing unit 312 corrects, processes, and edits image data received from the scanner 13 via the scanner I/F 311. In addition, the scanner image processing unit 312 determines the type of the received image data. The type of image data includes a color document, a black and white document, text documents, and a photo document. Subsequently, the scanner image processing unit 312 causes the determination results to be appended to the image data as attribute data. The details of the processing performed by the scanner image processing unit 312 will be described later.

The compression unit 313 divides image data into unit blocks made up of 32 pixels by 32 pixels. These 32×32 pixel blocks are referred to as tile images.

Figure 4:
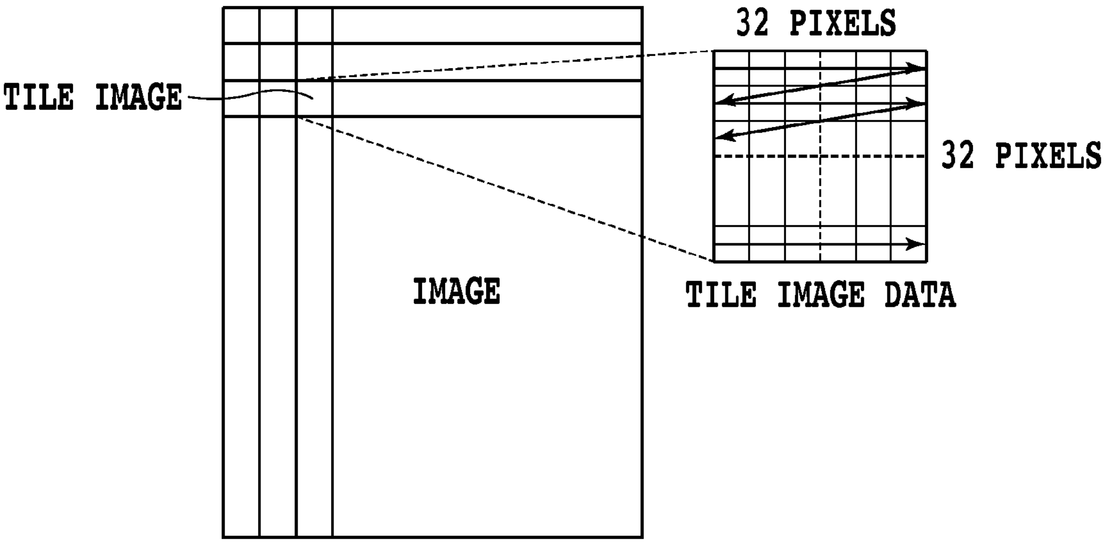
FIG. 4 is a diagram conceptually illustrating the relationship between an image and tile images.

FIG. 4 is a diagram conceptually illustrating the relationship between an image and tile images.

Each tile image contains 32×32 pixel tile image data. Average luminance information for the 32×32 pixels and the location of the tile image in the document is appended to the tile image data as header information.

The compression unit 313 compresses image data made up of a plurality of tile image data. The decompression unit 316 decompresses the image data made up of a plurality of tile image data, and then rasterizes and sends the decompressed image data to the printer image processing unit 315.

The printer image processing unit 315 receives the image data and performs image processing on the image data in accordance with the attribute data appended to the image data. The printer I/F 314 outputs the processed image data to the printer 14. The details of the processing performed by the printer image processing unit 315 will be described later.

The image converter 317 performs predetermined conversion processing on the image data. The image converter 317 includes a decompression unit 318, a compression unit 319, a rotation unit 320, a converter 321, a color space converter 322, a bi-level to multi-level converter 323, a compositing unit 327, a displacement unit 325, and a multi-level to bi-level converter 324.

The decompression unit 318 decompresses received image data. The compression unit 319 compresses received image data. The rotation unit 320 rotates received image data. The scaler 321 performs resolution conversion processing (conversion from 600 dpi to 200 dpi, for example) on received image data. A color space converter 322 converts a color space of the received image data. The color space converter 322 performs processing such as well-known background removal processing using a matrix or table, well-known log conversion processing (RGB→CMY (cyan magenta yellow)), or well-known output color correction processing (CMY→CMYK (cyan magenta yellow black)). The bi-level to multi-level converter 323 converts received bi-level image data into 256-level image data. The multi-level to bi-level converter 324 converts received 256-level image data into bi-level image data using a technique such as error diffusion.

The compositing unit 327 composites two sets of received image data to create image data for a single image. When compositing two sets of image data, a method may be applied wherein the composite luminance values are taken to be the average of the luminance values for the pixels to be composite, or a method may be applied wherein the luminance value of a brighter pixel is taken to be the composite luminance value. In addition, it is also possible to use a method wherein a darker pixel is taken to be the composite pixel. Furthermore, it is possible to use methods whereby the composite luminance values are determined by subjecting the pixels to be composited to operations such as logical addition (OR) operations, logical product (AND) operations, or exclusive logical addition (XOR) operations. All of the above compositing methods are well-known techniques.

The thinning unit 326 performs resolution conversion by thinning pixels in the received image data, thereby creating image data that is, for example ½, ¼, or ⅛, the resolution of the received image data. The displacement unit 325 applies margins to, or removes margins from, the received image data.

The components described above constitute the internal configuration of the image converter 317.

The RIP (raster image processor) 328 receives intermediate data created on the basis of PDL (page description language) code data transmitted from a source such as the PC 40, and then creates (multi-valued) bitmap data therefrom.

Figure 5:
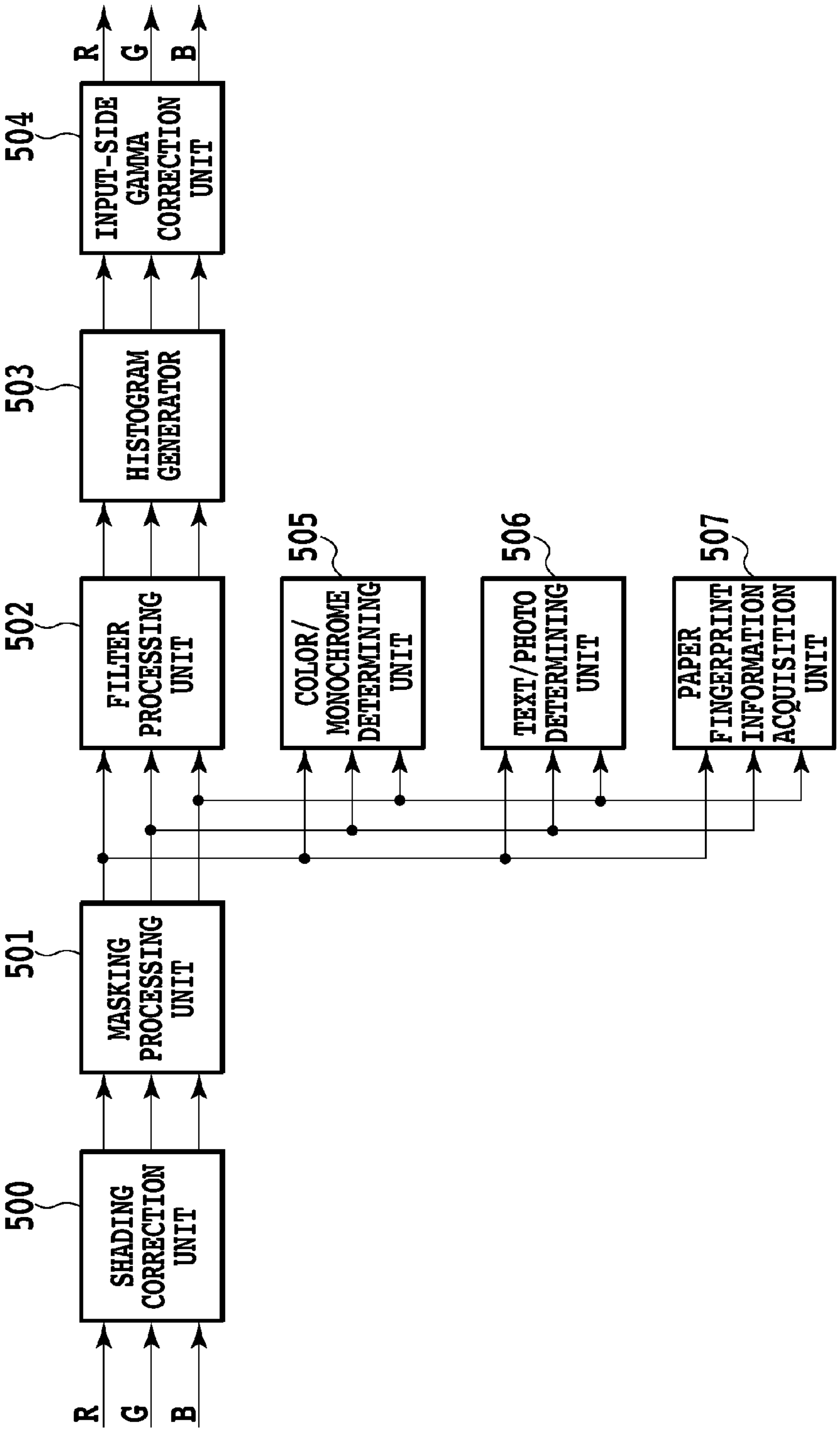
FIG. 5 is a block diagram showing an exemplary configuration of scanner image processing unit.

FIG. 5 is a block diagram showing an exemplary configuration of the scanner image processing unit 312.

The scanner image processing unit 312 includes a shading correction unit 500, a masking processing unit 501, a filter processing unit 502, a histogram generator 503, an input-side gamma correction unit 504, a color/monochrome determining unit 505, a text/photo determining unit 506, and a paper fingerprint information acquisition unit 507.

The scanner image processing unit 312 receives image data made up of 8-bit luminance signals for each color R, G, and B.

The shading correction unit 500 performs shading correction on the luminance signals. As described above, shading correction is processing to prevent misreading of the brightness of the document due to sensitivity fluctuations of the optical unit. Furthermore, as described above, the shading correction unit 500 is also configured to be able to perform gain adjustment in response to commands from the CPU 301.

The masking processing unit 501 converts the luminance signals that have been processed for shading correction into standard luminance signals that do not depend on the filter colors of the optical unit.

The filter processing unit 502 arbitrarily corrects the spatial frequency of the received image data. This processing involves subjecting the received image data to arithmetic processing using a 7×7 matrix, for example. Meanwhile, the user is also able to operate the operation unit 12 of the image forming device 10 and thus to set a copy mode by selecting a text mode, a photo mode, or a text/photo mode. If the text mode is selected by the user, then the filter processing unit 502 applies a text filter to the entire set of image data. If the photo mode is selected, then the filter processing unit 502 applies a photo filter to the entire set of image data. If the text/photo mode is selected, then the filter processing unit 502 adaptively switches the filter for each pixel according to a text/photo determination signal (a portion of the attribute data) to be hereinafter described. In other words, for each pixel, it is determined whether to apply a photo filter or a text filter according to the copy mode. In the photo filter, coefficients are configured such that only high-frequency components are smoothed. This is done to make rough portions in the image less visible. In addition, in the text filter, coefficients are configured such that edges are strongly emphasized. This is done to sharpen the text.

The histogram generator 503 samples luminance data of each pixel constituting the received image data. More specifically, the histogram generator 503 samples the luminance data within a rectangular region delimited by a start point and an end point respectively specified in both the main scanning direction and the vertical scanning direction, the sampling being performed at a fixed pitch in the main scanning direction and the vertical scanning direction. Subsequently, the histogram generator 503 generates histogram data on the basis of the sampling results. The generated histogram data is then used to estimate the background level when performing background removal processing.

The input-side gamma correction unit 504 uses a table or similar information to convert the histogram data into luminance data having non-linear characteristics.

The color/monochrome determining unit 505 determines whether each pixel constituting the received image data is chromatic or achromatic, and then causes the determination results to be appended to the image data as a color/monochrome determination signal (a portion of the attribute data).

The text/photo determining unit 506 examines each pixel constituting the image data to determine if a given pixel is a pixel constituting text, a pixel constituting a halftone dot, a pixel, which constitutes text, inside a halftone dot, or a pixel constituting a solid image. The text/photo determining unit 506 makes this determination on the basis of the pixel value of the pixel in question as well as the pixel values of the pixels in the vicinity of the pixel in question. Pixels that do not fit into any particular category are pixels constituting a white region. Subsequently, the text/photo determining unit 506 causes the determination results to be appended to the image data as a text/photo determination signal (a portion of the attribute data).

The paper fingerprint information acquisition unit 507 determines a suitable region for the paper fingerprint information acquisition region from among the RGB image data received from the shading correction unit 500, and then acquires paper fingerprint information in the determined paper fingerprint information acquisition region. The suitable region as well as the paper fingerprint information acquisition method will be described later.

Figure 6:
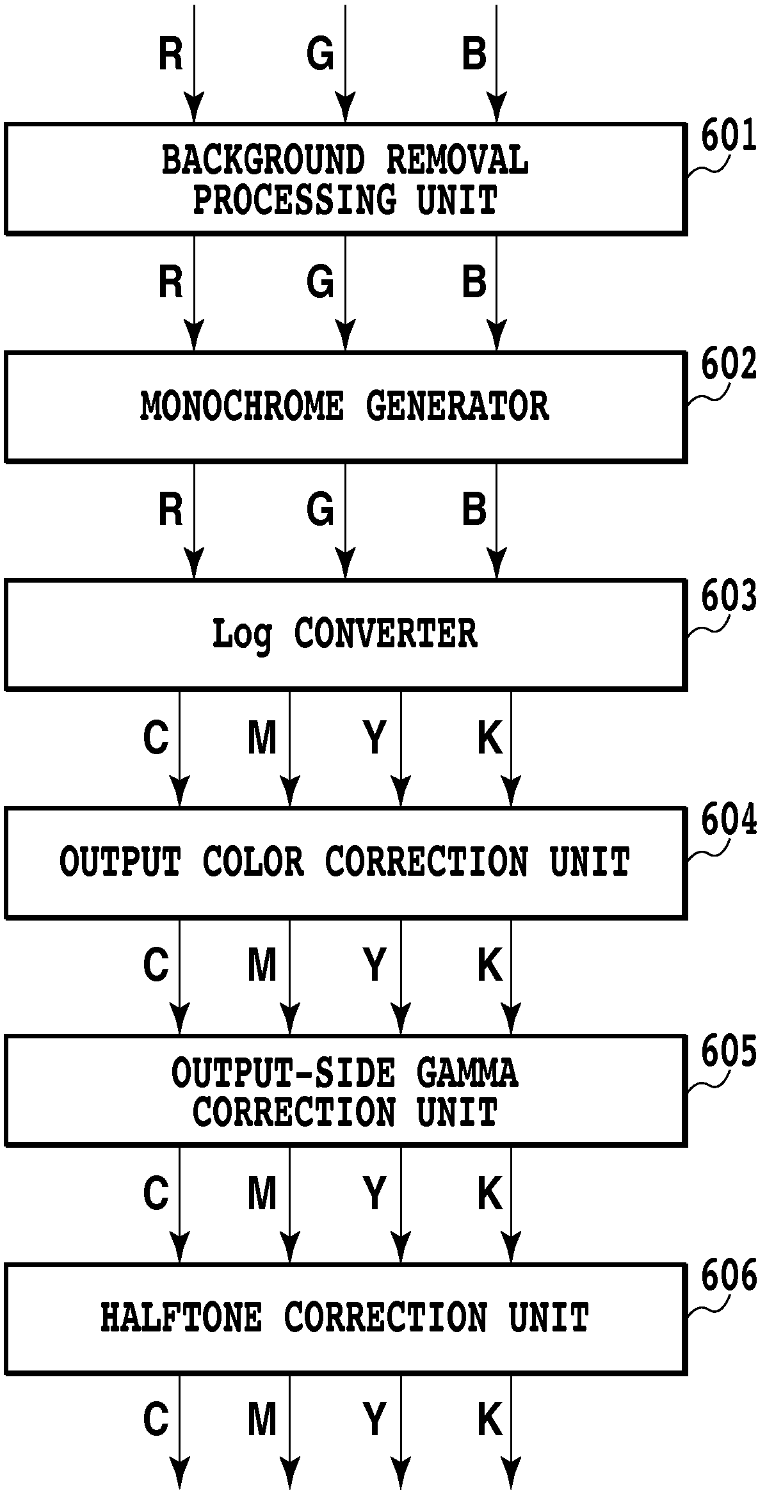
FIG. 6 is a block diagram showing an exemplary configuration of a printer image processing unit.

FIG. 6 is a block diagram showing an exemplary configuration of the printer image processing unit 315.

The printer image processing unit 315 includes a background removal processing unit 601, a monochrome generator 602, a log converter 603, an output color correction unit 604, an output-side gamma correction unit 605, and a halftone correction unit 606.

The background removal processing unit 601 removes background color from the image data using the histogram generated by the scanner image processing unit 312.

The monochrome generator 602 converts color data into monochrome data.

The log converter 603 performs luminous-intensity conversion. The log converter 603 converts image data input as RGB into CMY image data, for example.

The output color correction unit 604 performs output color correction. For example, the output color correction unit 604 converts image data input as CMY into CMYK image data using a table or matrix.

The output-side gamma correction unit 605 performs correction such that the signal values input into the output-side gamma correction unit 605 is proportional to the reflection intensity values after outputting a copy.

The halftone correction unit 606 performs halftone processing to match the number of halftones of the output printer unit. For example, received high contrast image data may be converted to bi-level or 32-level image data.

It should be appreciated that it is also possible to make each of processing units in the scanner image processing unit 312 and the printer image processing unit 315 output received image data without performing the respective processing therefor.

(Processing for Acquiring and Registering Paper Fingerprint Information)

Figure 7:
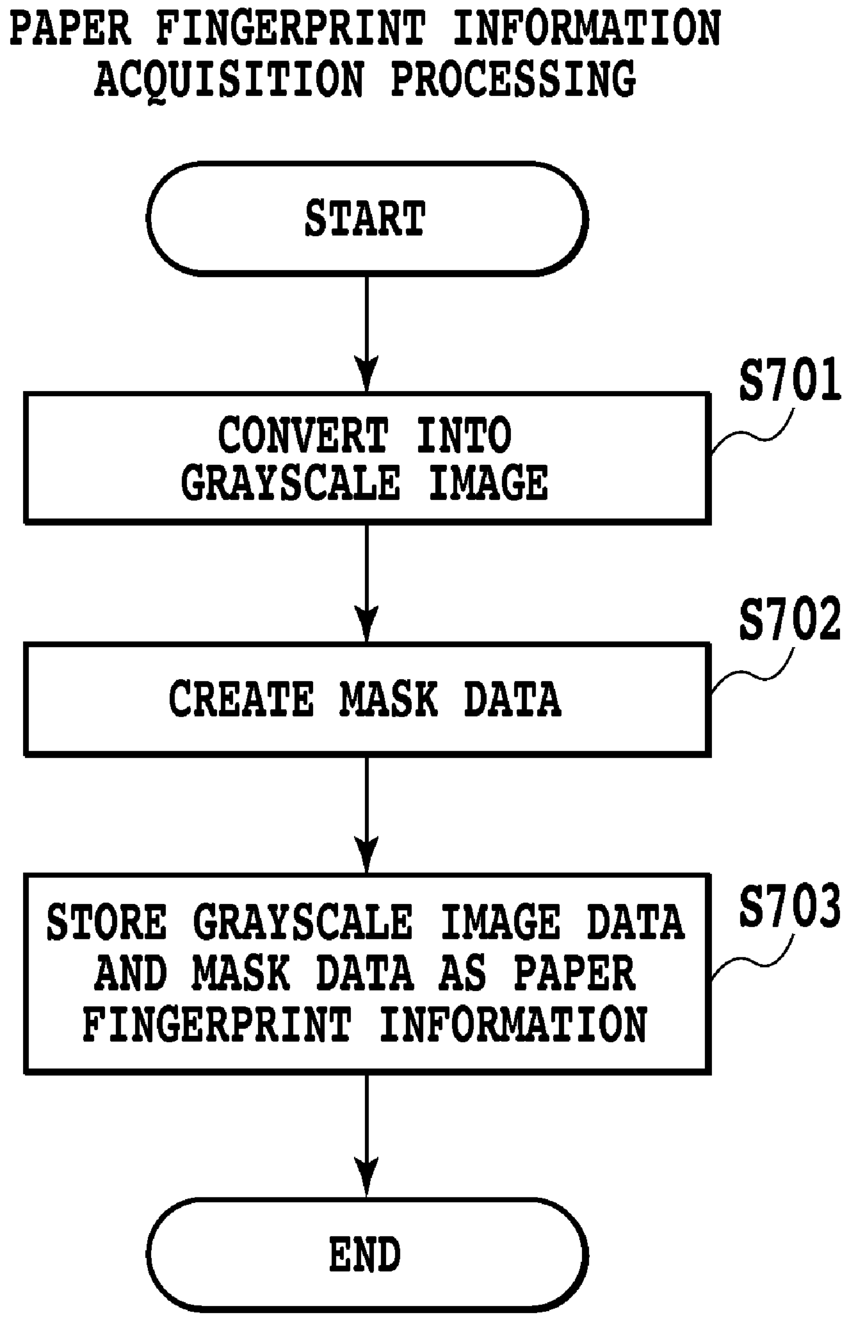
FIG. 7 is a flowchart showing processing for acquiring paper fingerprint information performed by a paper fingerprint information acquisition unit.

FIG. 7 is a flowchart showing the processing for acquiring paper fingerprint information that is performed by the paper fingerprint information acquisition unit 507 shown in FIG. 5.

In S701, the paper fingerprint information acquisition unit 507 converts image data into grayscale image data.

In S702, the paper fingerprint information acquisition unit 507 creates mask data for removing, from the image that was converted into grayscale image data, information such as printed and handwritten text that can cause an erroneous determination when comparing paper fingerprint information. The mask data is binary data containing values of either 0 or 1. For pixels in the grayscale image data whose luminance signal values are equal to or greater than (i.e., brighter than) a first threshold value, the paper fingerprint information acquisition unit 507 sets the mask data value to 1. For pixels whose luminance signal values are less than the first threshold value, the paper fingerprint information acquisition unit 507 sets the mask data value to 0. The paper fingerprint information acquisition unit 507 performs the above processing with respect to each pixel contained in the grayscale image data.

In S703, the image data that was converted to grayscale and the mask data are acquired as paper fingerprint information. It should be appreciated that while in S701 the image data itself that was converted to grayscale was also referred to as the paper fingerprint information, in the present embodiment the above two sets of data are to be collectively referred to as the paper fingerprint information.

The paper fingerprint information acquisition unit 507 stores the acquired paper fingerprint information in the RAM 302 via a data bus (not shown).

In addition, processing for registering paper fingerprint information is realized as a result of the CPU 301 reading the paper fingerprint information from the RAM 302 and then registering the paper fingerprint information in a server (not shown). When registering the paper fingerprint information in the server, a control number indicating the original is displayed on the operation unit 12. Thus, during paper fingerprint information verification, the paper fingerprint information can be verified as a result of the user inputting the control number.

Meanwhile, processing for verifying paper fingerprint information is realized as a result of the CPU 301 reading out the paper fingerprint information of the document that the paper fingerprint information acquisition unit 507 stored in the RAM 302, and then comparing the read-out paper fingerprint information to the paper fingerprint information already registered in the server. It should be appreciated that while in the present embodiment the verification of paper fingerprint information is performed by inputting a control number, verification processing may also be performed by applying a unique ID or similar information to the document during the processing for registering the paper fingerprint information, and then referring to that ID for verification.

The CPU 301 reads out the paper fingerprint information that the paper fingerprint information acquisition unit 507 stored in the RAM 302, and then verifies the paper fingerprint information by comparing the read-out paper fingerprint information (hereinafter referred to as paper fingerprint information A) to the paper fingerprint information already registered in the server (hereinafter referred to as paper fingerprint information B).

Figure 8:
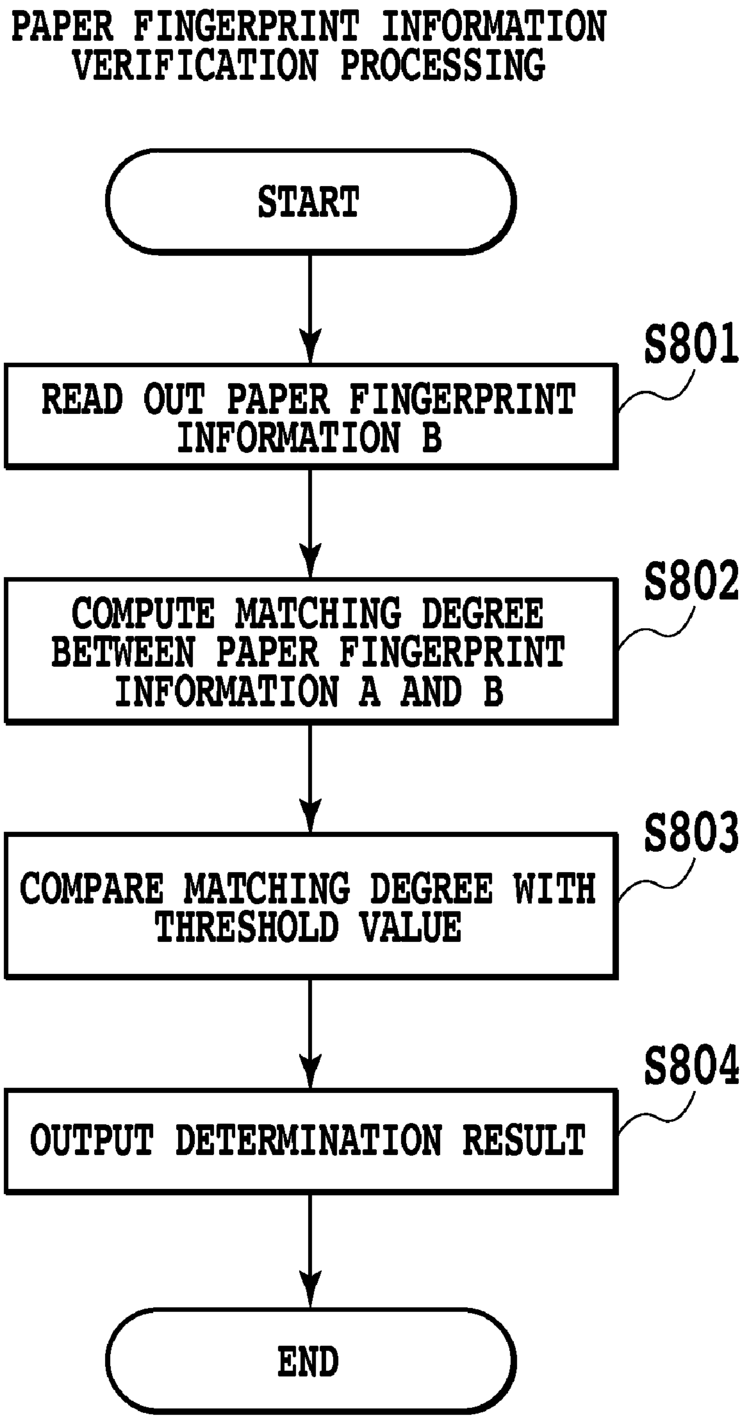
FIG. 8 is a flowchart showing paper fingerprint information verification processing.

FIG. 8 is a flowchart showing the paper fingerprint information verification processing. Each step in the flowchart shown in FIG. 8 is controlled by the CPU 301.

In S801, the CPU 301 reads out the paper fingerprint information B from the server.

In S802, the CPU 301 compares the paper fingerprint information A with the paper fingerprint information B, and computes a matching degree. In S803, the matching degree computed in S802 is compared with a predetermined threshold value, and a verification result ("Valid" or "Invalid") is obtained. The matching degree herein is a value indicating the degree to which the paper fingerprint information A and the paper fingerprint information B are similar.

A specific method for computing the matching degree will now be described with reference to FIGS. 20A to 23B.

Figure 20A:
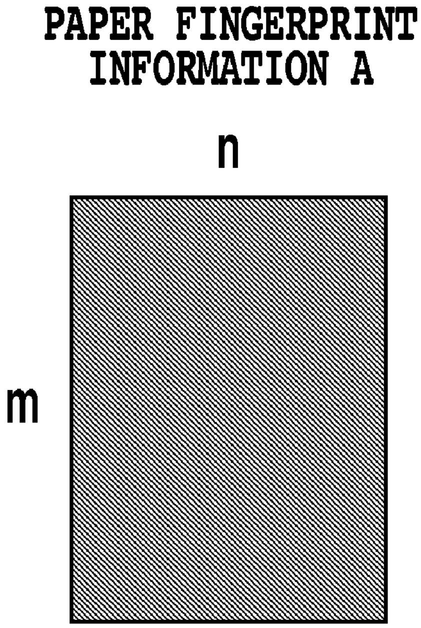
FIG. 20A is a diagram illustrating paper fingerprint information.
Figure 20B:
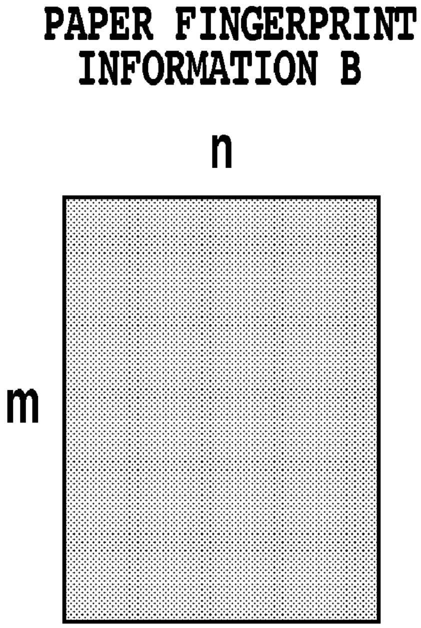
FIG. 20B is a diagram illustrating paper fingerprint information.

FIG. 20A is a diagram illustrating the paper fingerprint information A. FIG. 20B is a diagram illustrating the paper fingerprint information B. Each set of paper fingerprint information is made up of n horizontal pixels and m vertical pixels.

(Equation 1)

$$E(i,j)=\frac{\sum_{x,y}\alpha_i(x,y)\alpha_2(x-i,y-j)\{f_1(x,y)-f_2(x-i,y-j)\}^2}{\sum_{x,y}\alpha_1(x,y)\alpha_2(x-i,y-j)} \tag{1}$$

Herein, E(i,j) is the error value between the paper fingerprint information A and the paper fingerprint information B. $\alpha_1$ is the mask data contained in the paper fingerprint information B. $f_1$ is the grayscale image data contained in the paper fingerprint information B. $\alpha_2$ is the mask data contained in the paper fingerprint information A. $f_2$ is the grayscale image data contained in the paper fingerprint information A.

In Equation (1), (i,j) is iterated for each pixel over the range {(−n+1, . . . ,n−1),(−m+1, . . . m−1)}, and thus E(i,j) is evaluated (2n−1)×(2m−1) times. In other words, E(i,j) is evaluated from E(−n+1,−m+1) to E(n−1,m−1).

Figure 21A:
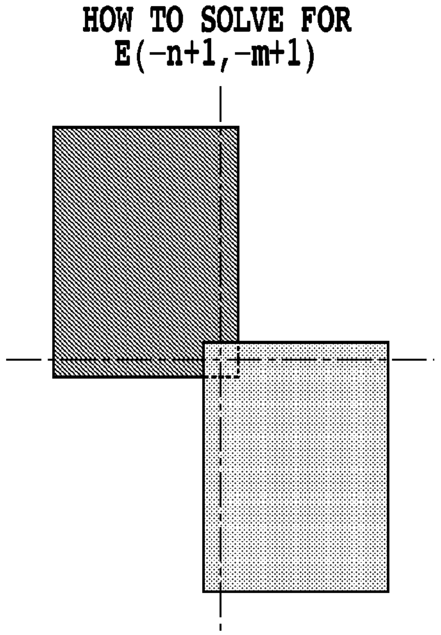
FIG. 21A is a diagram illustrating paper fingerprint information.

FIG. 21A shows the state wherein the single uppermost left pixel of the paper fingerprint information B is overlapping the single lowermost right pixel of the paper fingerprint information A. In this state, the error value solved for by Equation (1) becomes E(−n+1, −m+1).

Figure 21B:
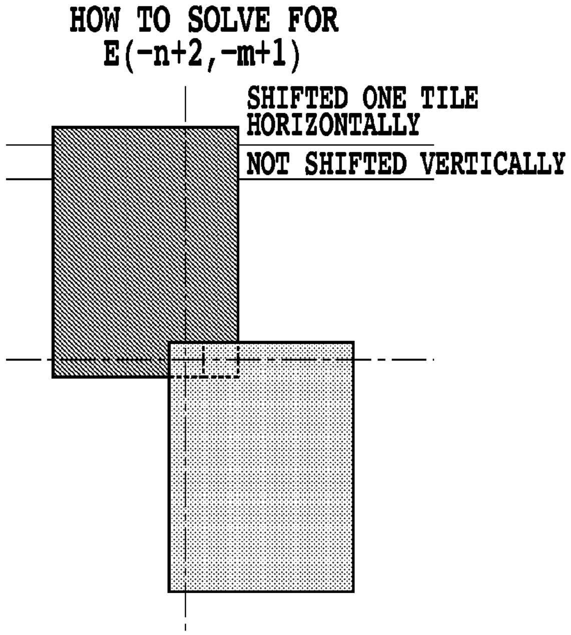
FIG. 21B is a diagram illustrating paper fingerprint information.
Figure 21C:
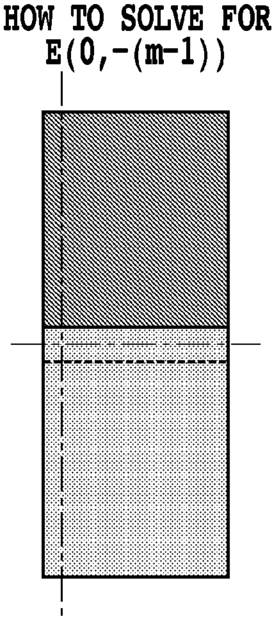
FIG. 21C is a diagram illustrating paper fingerprint information.
Figure 21D:
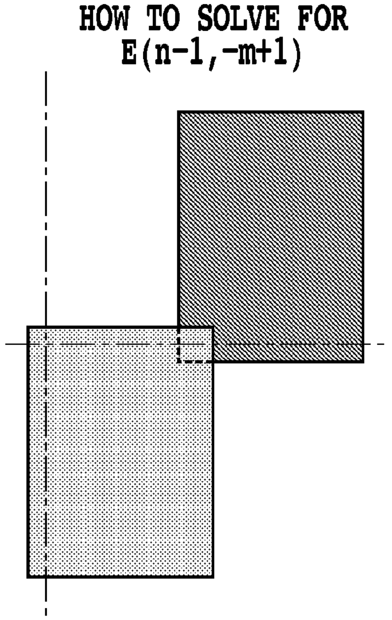
FIG. 21D is a diagram illustrating paper fingerprint information.

FIG. 21B shows the state wherein the paper fingerprint information A has been shifted one pixel to the right compared to the state shown in FIG. 21A. In this state, the error value E solved for by Equation (1) becomes E(−n+2,−m+1). In this way, the error value is solved for while shifting the paper fingerprint information A one pixel at a time to the right with respect to the paper fingerprint information B. FIG. 21C shows the state wherein the lowermost pixel row of the paper fingerprint information A is overlapping the uppermost pixel row of the paper fingerprint information B. In this state, E(0,−(m−1)) is evaluated. FIG. 21D shows the state wherein the paper fingerprint information B has been further shifted to the right, and the single uppermost right pixel of the paper fingerprint information B is overlapping the single lowermost left pixel of the paper fingerprint information A. In this state, E(n−1,−m+1) is evaluated. In this way, as the paper fingerprint information A is shifted to the right with respect to the paper fingerprint information B, i in E(i,j) is incremented by 1.

Figure 22A:
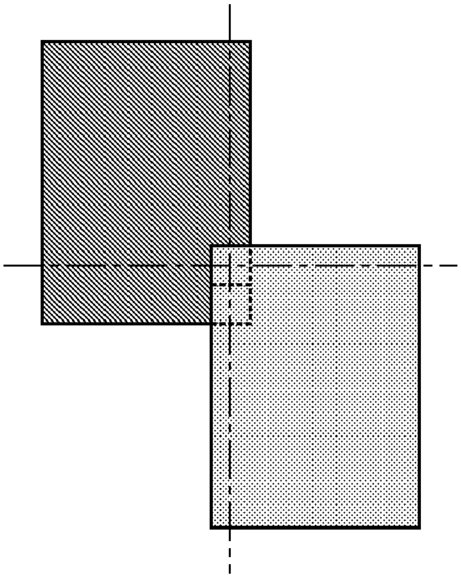
FIG. 22A is a diagram illustrating paper fingerprint information.

FIG. 22A shows the state wherein the paper fingerprint information A has been shifted one pixel down in the vertical direction with respect to the paper fingerprint information B compared to the state shown in FIG. 21A. In this state, E(−n+1,−m+2) is evaluated.

Figure 22B:
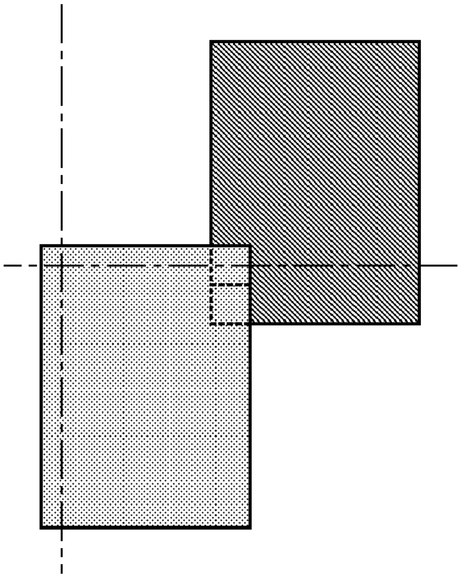
FIG. 22B is a diagram illustrating paper fingerprint information.

FIG. 22B shows the state wherein the paper fingerprint information A has been shifted to the rightmost edge of the paper fingerprint information B. In this state, E(n−1,−m+2) is evaluated.

Figure 23A:
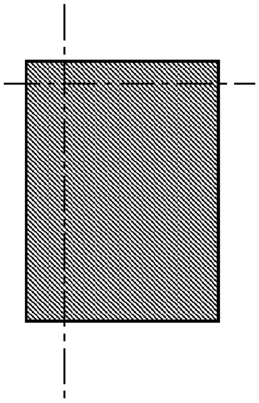
FIG. 23A is a diagram illustrating paper fingerprint information.

FIG. 23A shows the state wherein the paper fingerprint information A is completely overlapping the paper fingerprint information B. In this state, the error value becomes E(0,0).

Figure 23B:
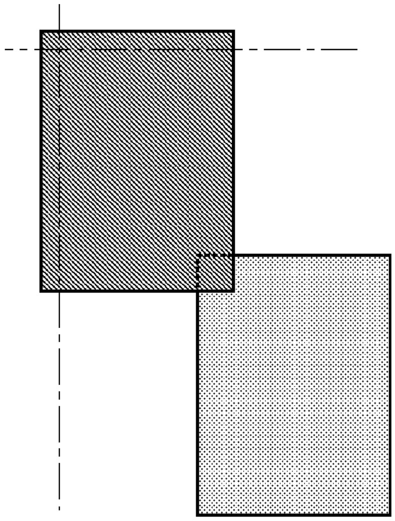
FIG. 23B is a diagram illustrating paper fingerprint information.

Finally, in the state shown in FIG. 23B, E(n−1,m−1) is evaluated.

In this way, the error value is solved for while shifting each set of paper fingerprint information such that the paper fingerprint information A and the paper fingerprint information B are always overlapping by at least one pixel. As a result, (2n−1)×(2m−1) error values are acquired.

In order to contemplate the meaning of Equation (1), consider, by way of example, the case wherein i=0, j=0, $\alpha_1$(x,y)=1 (wherein x=(0, . . . ,n) and y=(0, . . . ,m)), and $\alpha_2$(x−i,y−j)=1 (wherein x=(0, . . . ,n) and y=(0, . . . ,m)). In other words, E(0,0) is evaluated in the case where $\alpha_1$(x,y)=1

(wherein x=(0, . . . ,n) and y=(0, . . . ,m)), and $\alpha_2(x-i,y-j)=1$ (wherein x=(0, . . . ,n) and y=(0, . . . ,m)). Note that when i=0 and j=0, the paper fingerprint information A and the paper fingerprint information B are completely overlapping, as shown in FIG. 23A.

The condition $\alpha_1(x,y)=1$ (wherein x=(0, . . . ,n) and y=(0, . . . ,m)) indicates that all of the pixels in the paper fingerprint information B are bright. In other words, when the paper fingerprint information B was acquired, there was no rubbish or colorant such as toner or ink whatsoever in the paper fingerprint acquisition region.

The condition $\alpha_2(x-i,y-j)=1$ (wherein x=(0, . . . ,n) and y=(0, . . . ,m) ) indicates that all of the pixels in the paper fingerprint information A are bright. In other words, when the paper fingerprint information A was acquired, there was absolutely no rubbish or colorant such as toner or ink in the paper fingerprint acquisition region.

When $\alpha_1(x,y)=1$ and $\alpha_2(x-i,y-j)=1$ hold true for all pixels, Equation (1) can be expressed (Equation 2)

$$E(0,0)=\sum_{x=0,y=0}^{n,m}\{f_1(x,y)-f_2(x,y)\}^2$$

as Equation (2) above.

$\{f_1(x,y)-f_2(x,y)\}^2$ is the square of the error between the grayscale image data contained in the paper fingerprint information A and the grayscale image data contained in the paper fingerprint information B. Consequently, Equation (1) represents the sum of the squares of the differences for each pixel in the grayscale image data of the paper fingerprint information A and the paper fingerprint information B. Consequently, E(0,0) becomes a smaller value when $f_1(x,y)$ and $f_2(x,y)$ are more similar.

Similarly, other values of E(i,j) are solved for, and E(i,j) becomes a smaller value when $f_1(x,y)$ and $f_2(x,y)$ are more similar. Consequently, when E(k,l)=min{E(i,j)}, the position of the paper fingerprint information B when the paper fingerprint information B was acquired, and the position of the paper fingerprint information A when the paper fingerprint information A was acquired are misaligned by (k,l).

(The significance of $\alpha$)

The numerator of Equation (1) expresses the value of the sum of the results of $\{f_1(x,y)-f_2(x,y)\}^2$ multiplied by $\alpha_1$ and $\alpha_2$. Both $\alpha_1$ and $\alpha_2$ are respectively 0 for pixels of high color intensity, and 1 for pixels of low color intensity. Consequently, when either $\alpha_1$ or $\alpha_2$ is 0, the expression $\alpha_1\alpha_2\{f_1(x,y)-f_2(x,y)\}^2$ becomes 0. In other words, when a pixel in either the paper fingerprint information A or the paper fingerprint information B has a high color intensity, the intensity difference between the two sets of paper fingerprint information with respect to that pixel is not considered. This is done to ignore pixels having rubbish or colorant applied thereupon.

Since the number resulting from summing the $\Sigma$ term fluctuates, the equation is normalized by dividing by $\Sigma\alpha_1(x,y)\alpha_2(x-i,y-j)$. Furthermore, error values E(i,j), wherein the denominator $\Sigma\alpha_1(x,y)\alpha_2(x-i,y-j)$ of Equation (1) becomes 0, are not included in the set of error values {E(−(n−1),−(m−1)), . . . ,E(n−1,m−1)} to be hereinafter described.

(Method for Computing the Matching Degree)

As described above, when E(k,l)=min{E(i,j)}, the position of the paper fingerprint information B when the paper fingerprint information B was acquired, and the position of the paper fingerprint information A when the paper fingerprint information A was acquired are misaligned by an amount (k,l).

Subsequently, the matching degree of the paper fingerprint information A and the paper fingerprint information B is computed using E(k,l) and E(i,j).

First, the average value is calculated for the set of error values solved for using Equation (1) (for example, a set of error values {E(0,0)=10,E(0,1)=50,E(1,0)=50,E(1,1)=50} yields an average value of 40) (A). Next, the individual error values (10, 50, 50, 50) are subtracted from the average value (40), thereby yielding a new set of error values (30, −10, −10, −10) (B). Next, the standard deviation is calculated from the new set of error values ($30\times30+10\times10+10\times10+10\times10=1200$, $1200/4=300$, $\sqrt{300}=10\sqrt{3}\approx17$). Next, the new set of error values is divided by 17 to calculate the quotients (1, −1, −1, −1) (C). Next, the maximum value 1 of the quotients thus solved for is taken to be the matching degree. This value of 1 corresponds to E(0,0)=10. Thus, in this case, E(0,0)=min{E(i,j)}.

(Conceptual Explanation of Paper Fingerprint Information Verification Processing)

Paper fingerprint information verification processing includes the following three processes. The first process involves taking the smallest error value from among a set of plural error values, and then calculating how much the smallest error value differs from the average error value. The second process involves solving for the matching degree by dividing that difference by the standard deviation. The third process involves comparing the matching degree to a threshold value to obtain a verification result. The standard deviation herein means the average value of the differences between each error value and the average value. In other words, the standard deviation expresses the degree to which error values in the set are scattered. By dividing the magnitude of the difference between the smallest error value and the average error value by the standard deviation, it can be seen whether min{E(i,)} is a significantly smaller value or a slightly smaller value compared to the other values in the set E(i,j). When min{E(i,j)} is a significantly smaller value compared to the other values in the set E(i,j), the verification result is determined to be "Valid". For all other cases, the verification result is determined to be "Invalid".

(Rationality for Returning a Valid Verification Result Only in the Case where min{E(i,j)} is a Significantly Smaller Value Compared to the Other Values in the Set E(i,j))

Assume that the paper fingerprint information A and the paper fingerprint information B have been acquired from the same paper. In this case, there should be a location where the paper fingerprint information A and the paper fingerprint information B match almost exactly. At this location, E(i,j) becomes an exceedingly small value. On the other hand, if the paper fingerprint information acquisition location is shifted even slightly from this location, the association between the paper fingerprint information A and the paper fingerprint information B will be lost, and thus E(i,j) will become a large value. Thus, essentially, the condition that the two sets of paper fingerprint information be acquired from the same paper is equivalent to the condition that the smallest value of E(i,j) is a significantly smaller value compared to the other values in the set E(i,j).

(Configuration of the Operation Unit 12)

Figure 9:
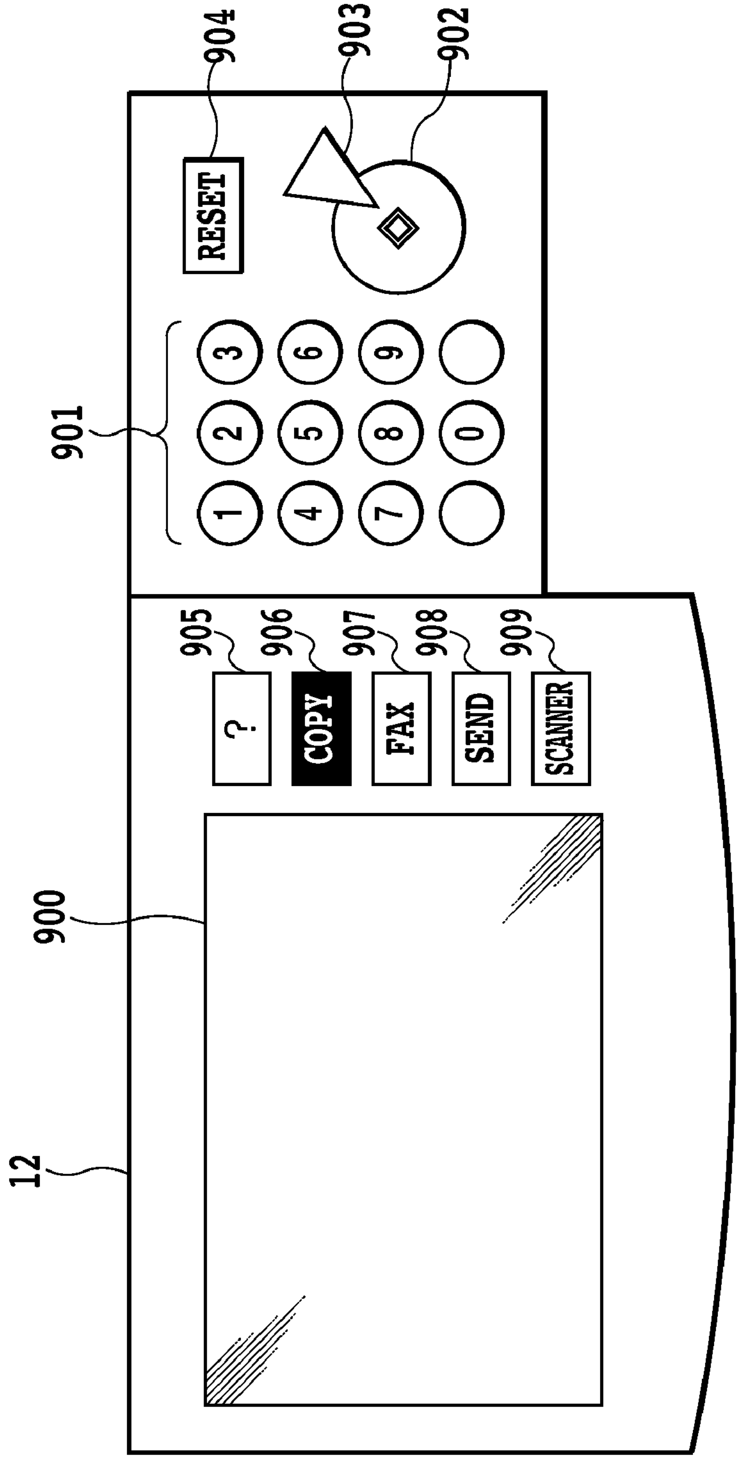
FIG. 9 is a diagram showing an exemplary configuration of an operation unit for an image forming device.

FIG. 9 is a diagram showing an exemplary configuration of the operation unit 12 for an image forming device.

The operation unit 12 includes, a LCD display unit 900, a numeric keypad 901, a start key 902, a stop key 903, a reset key 904, a guide key 905, a copy mode key 906, a fax key 907, a send key 908, and a scanner key 909.

The LCD display unit 900 displays a user interface screen. The menu screen displayed on the screen will be described hereinafter with reference to FIG. 10. The numeric keypad 901 is used when inputting numerals such as the number of copies. The start key 902 is used when commencing operations such as a copy operation or a document scanning operation after the user has set desired parameters. The stop key 903 is used to terminate an operation currently in progress. The reset key 904 is used when returning settings configured from the operation unit to their default values. The guide key 905 is used when the user does not understand the function of one or more keys. The copy mode key 906 is used when copying. The fax key 907 is used when configuring fax-related settings. The send key 908 is used when outputting file data to an external device such as a computer. The scanner key 909 is used when configuring settings for scanning images from an external device such as a computer.

Figure 10:
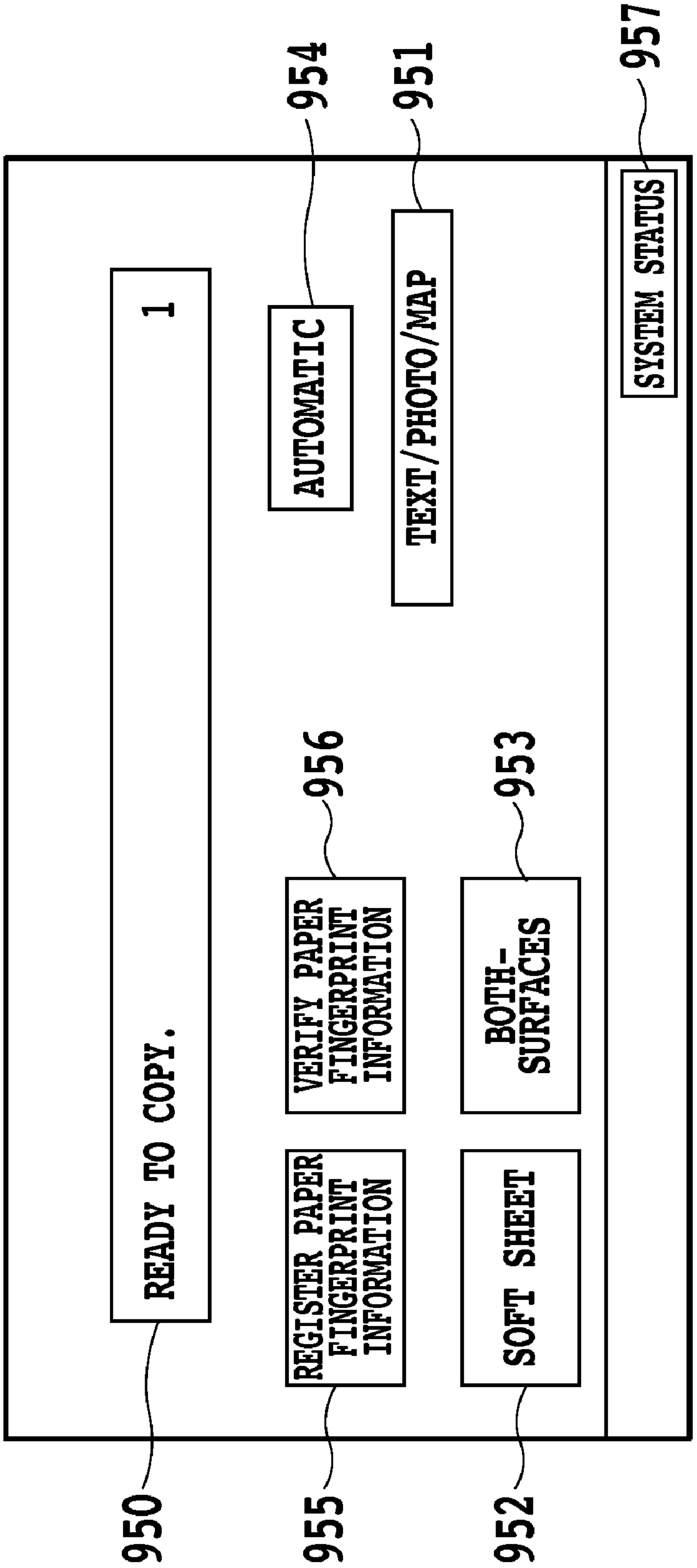
FIG. 10 shows a user interface screen displayed on a LCD (liquid crystal display) display unit of an operation unit.

FIG. 10 shows a user interface screen that is displayed on the LCD display unit 900 of the operation unit 12.

The LCD display unit 900 displays information indicating whether the image forming device 10 is ready to copy, as well as the number of copies set by the user. The tab 951 is used to select the type of document. By operating the tab 951, a text mode, a photo mode, or a text/photo mode can be selected. The tab 952 is used to configure finishing settings such as shift sort. The tab 953 is used to configure both-surfaces scanning and both-surfaces printing. The tab 954 is used to select the document scanning mode. By operating the tab 954, a color, black and white, or automatic (ACS) mode can be selected. Color copying is performed when the color mode is selected, while monochrome copying is performed when the black and white mode is selected. When the ACS mode is selected, the copy mode is determined using the color/monochrome determination signal described earlier.

The tab 955 is used to select paper fingerprint information registration processing. The paper fingerprint information registration processing will be described later. The tab 956 is the tab for selecting paper fingerprint information verification processing. The paper fingerprint information verification processing will be described later.

The tab 957 is a tab for displaying system status. When the tab 957 is operated, a list of image data stored in the HDD 304 within the image forming device 10 is displayed on screen.

(Configuring the Document Scanning Mode)

The user first places a document on a document tray (document placing platen) 202, and subsequently operates the operation unit 12 to set the document scanning method (i.e., the stationary document scanning method or the document feed scanning method). In addition, the user operates the tab 955 or the tab 956 to configure settings related to paper fingerprint information registration or paper fingerprint information verification. Furthermore, the user configures settings such as settings for specifying the document size, whether the document is a both-surfaces document, and whether the document sheaf contains mixed document types. After configuring these settings, the user presses the start key 902 to initiate document scanning.

(Exemplary Configuration of the Scanner)

Figure 11:
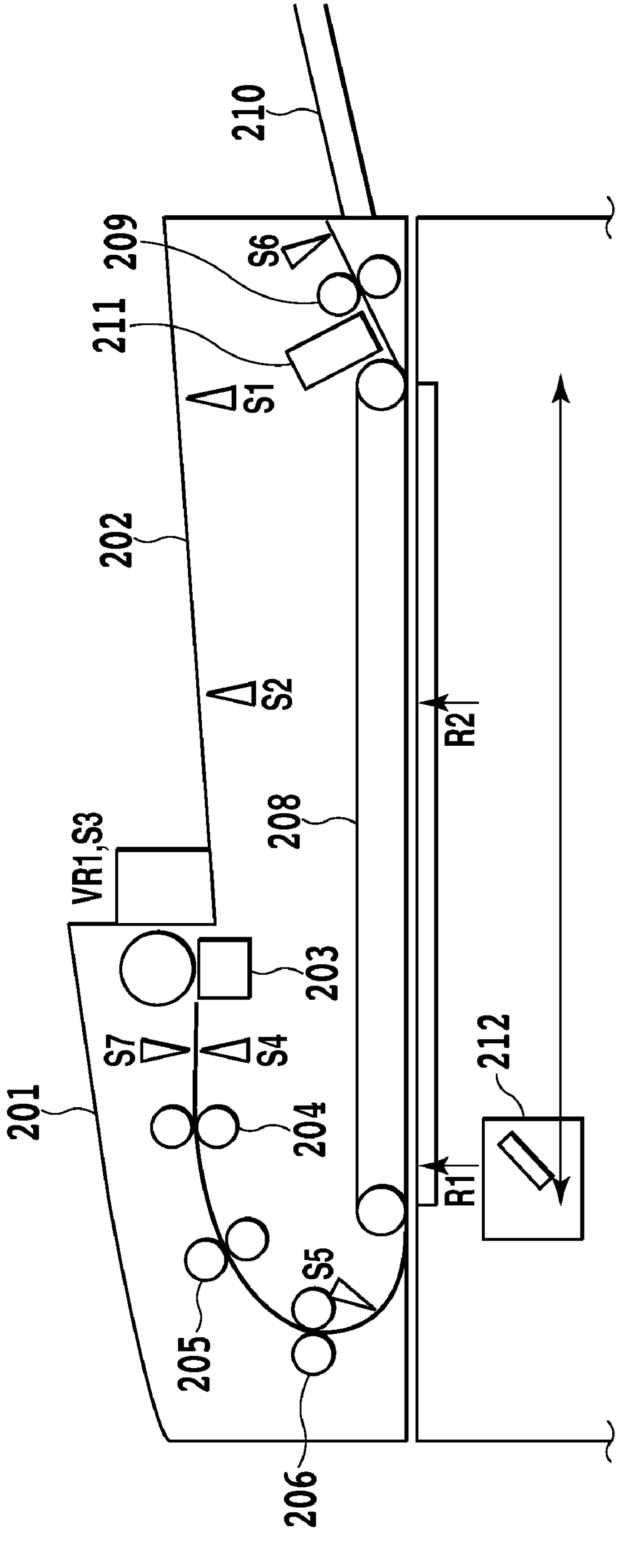
FIG. 11 is a diagram showing an exemplary configuration of a scanner.

FIG. 11 is a diagram showing an exemplary configuration of the scanner 13.

The scanner 13 includes a paper sheet conveying unit 201, a document tray 202, a separating unit 203, conveying rollers 204 and 205, and a resist roller 206. Additionally, the scanner 13 includes a scanning belt 208, an exit roller 209, a catch tray 210, a reverse side optical unit 211, an optical unit 212, and various sensors S1 to S7 and VR1.

The user first places a document sheaf on the document tray 202.

The paper sheet conveying unit 201 then pulls the document sheaf placed on the document tray 202 in toward the separating unit 203, where, one at a time, the uppermost sheet of the document sheaf is separated from the other sheets and conveyed to the conveying rollers 204 and 205.

The resist roller 206 is halting when the leading edge of the document reaches the roller. Subsequently, after correcting for the skew caused by the formation of a loop during conveyance by the conveying rollers 204 and 205, the resist roller 206 commences conveyance of the document. The resist roller 206 and the scanning belt 208 convey the document at a predetermined speed to a scanning position R1. When the leading edge of the document reaches the scanning position R1, the optical unit 212 held in place at the scanning position R1 commences exposure operations. When document scanning is complete, the scanning belt 208 conveys the document to the document exit unit.

The document exit unit uses the exit roller 209 to eject the document face-side down into the catch tray 210. In addition, when both-surfaces document scanning is selected, the reverse side optical unit 211 for scanning reverse side images is used to scan the reverse side of the document.

In addition, within the paper sheet conveying unit 201, a large-size detect sensor S1 and a small-size detect sensor S2 that detect document length on the document tray 202, as well as a width detect volume sensor VR1 and a width detect sensor S3 are provided. In addition, within the paper sheet conveying unit 201, a size sensor S4 that measures the length of the document by detecting the leading and trailing edges of the document, and a lead sensor S5 that announces the commencement of scanning by detecting the leading edge of the document are provided. In addition, within the paper sheet conveying unit 201, an exit sensor S6 and a document set sensor S7 that determines whether a document has been set on in the document tray 202 are provided.

Figure 12:
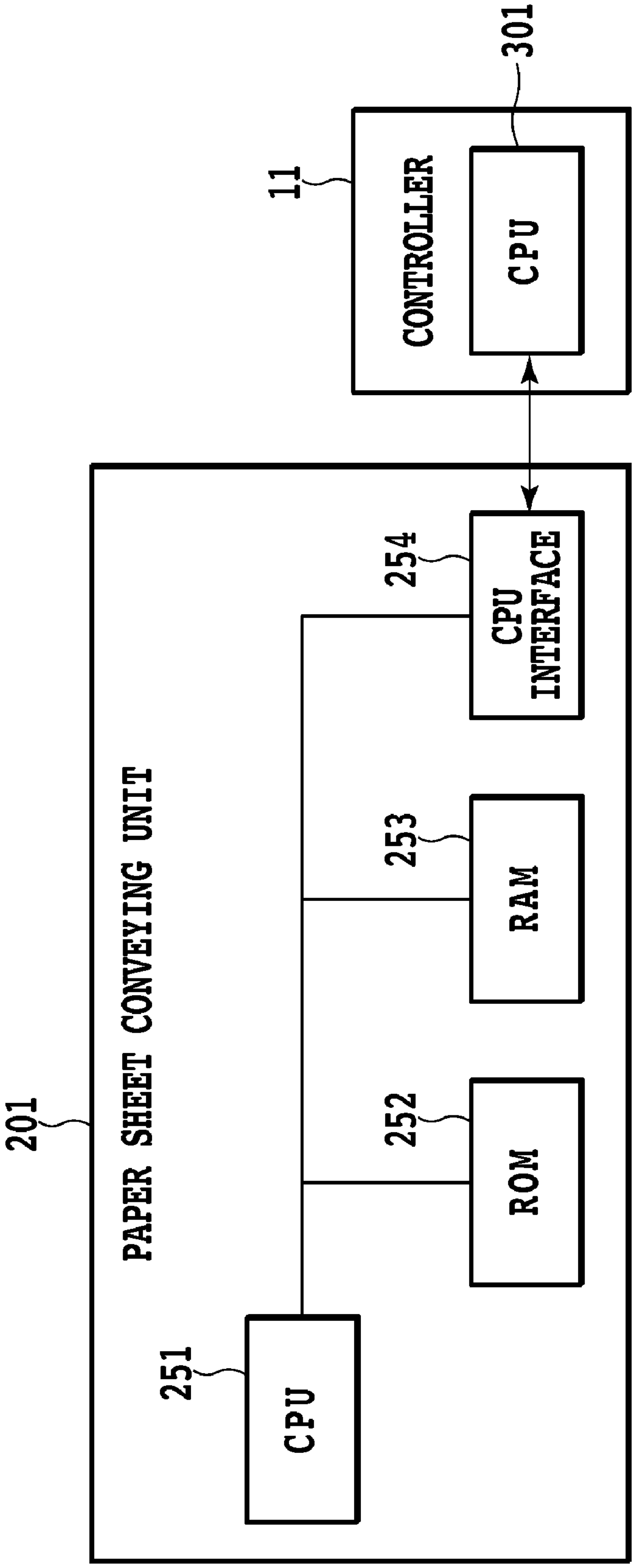
FIG. 12 is a block diagram showing the hardware configuration of a control system for a paper sheet conveying unit.

FIG. 12 is a block diagram showing the hardware configuration of the control system of the paper sheet conveying unit 201.

The paper sheet conveying unit 201 includes a CPU 251, a ROM 252, a RAM 253, and a CPU interface 254. The CPU 251 communicates with the CPU 301 of the controller 11 via the CPU interface 254. More particularly, the CPU 251 receives commands from the CPU 301 and performs overall control of the paper sheet conveying unit 201, while additionally processing data received from the various sensors. The ROM 252 stores a control program. The RAM 253 temporarily stores control data.

(Document Sheaf Separating Processing)

Figure 13:
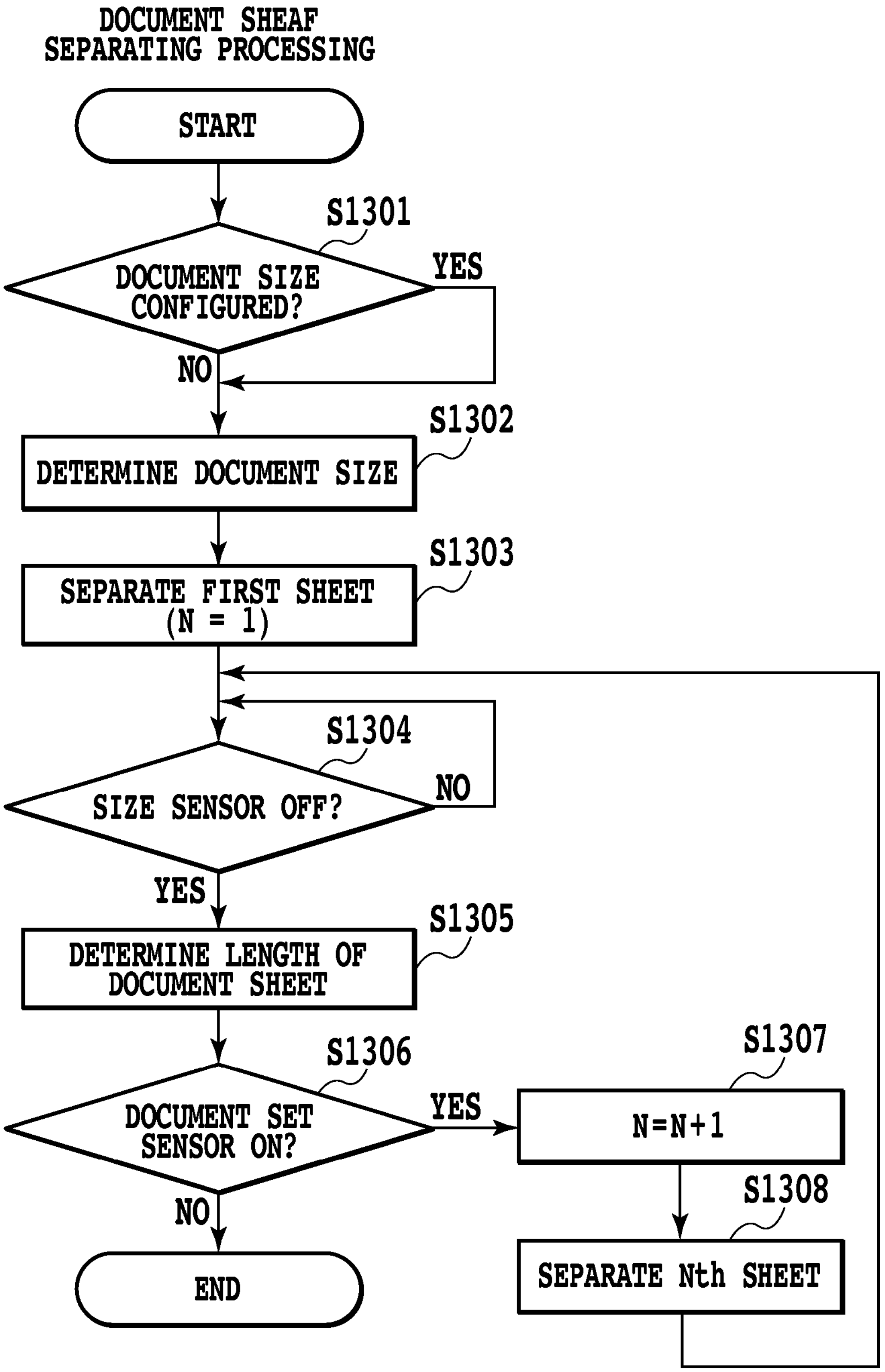
FIG. 13 is a flowchart showing processing for separating a document sheaf.

FIG. 13 is a flowchart showing processing for separating sheets of a document sheaf after the start key 902 has been pressed. This separating processing is controlled by the CPU 251 of the paper sheet conveying unit 201.

It is supposed that a document made up of two A4 size sheets has been placed on the document tray 202.

When the start key 902 is pressed, the CPU 251 first determines whether the document size has been set by a user (S1301).

If the document size has not been set by the user, the CPU 251 determines the document sizes on the basis of the signals detected by the various sensors (S1302). The various sensors herein refer to the small-size detect sensor S1 and the large-size detect sensor S2 disposed on the document tray 105, the width detect volume VR1, and the width detect sensor S3. In the present embodiment, the document size is taken to be A4.

The paper sheet conveying unit 201 then draws the document sheaf placed on the document tray 202 into the separating unit 203. The separating unit 203 separates and picks up the first sheet (N=1) of the document sheaf, and conveys this sheet to the conveying rollers 204 and 205 (S1303).

When the trailing edge of the first sheet of the document passes the size sensor S4, the size sensor S4 outputs an OFF signal. Upon receiving the OFF signal from the size sensor S4, the CPU 251 determines the length of the document sheet (S1304). This is performed in order to determine the length of each document sheet in the case where a mixed document has been set.

The CPU 251 then determines whether there exists a subsequent document sheet on the basis of the output signal of the document set sensor S7 (S1305). When the document set sensor S7 outputs an ON signal, the CPU 251 determines that a subsequent document sheet is on the document tray 105, and sets N=N+1 (S1307). Subsequently, the CPU 251 separates and picks up the second sheet (N=2) of the document sheaf (S1306). The CPU 251 repeats the above processing until the final document sheet is separated. When the document set sensor S9 outputs an OFF signal, the CPU 251 determines that the separation of the final document sheet has been completed, and the separating processing is terminated.

(Paper Fingerprint Information Scanning/Registration Processing in Stationary Document Scanning Mode)

Figure 14:
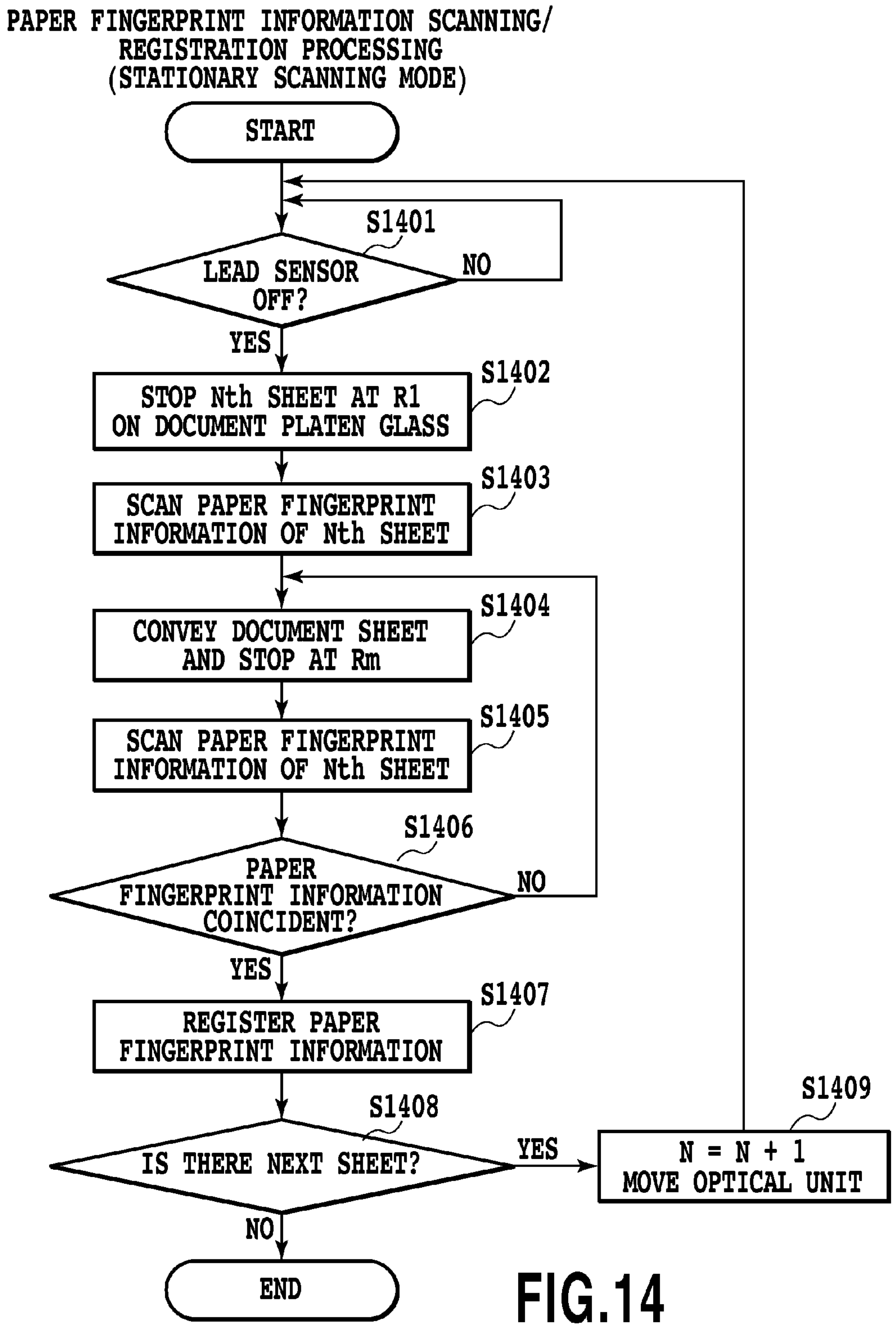
FIG. 14 is a flowchart showing a process flow for scanning paper fingerprint information in a stationary document scanning mode and then registering the paper fingerprint information.
Figure 15:
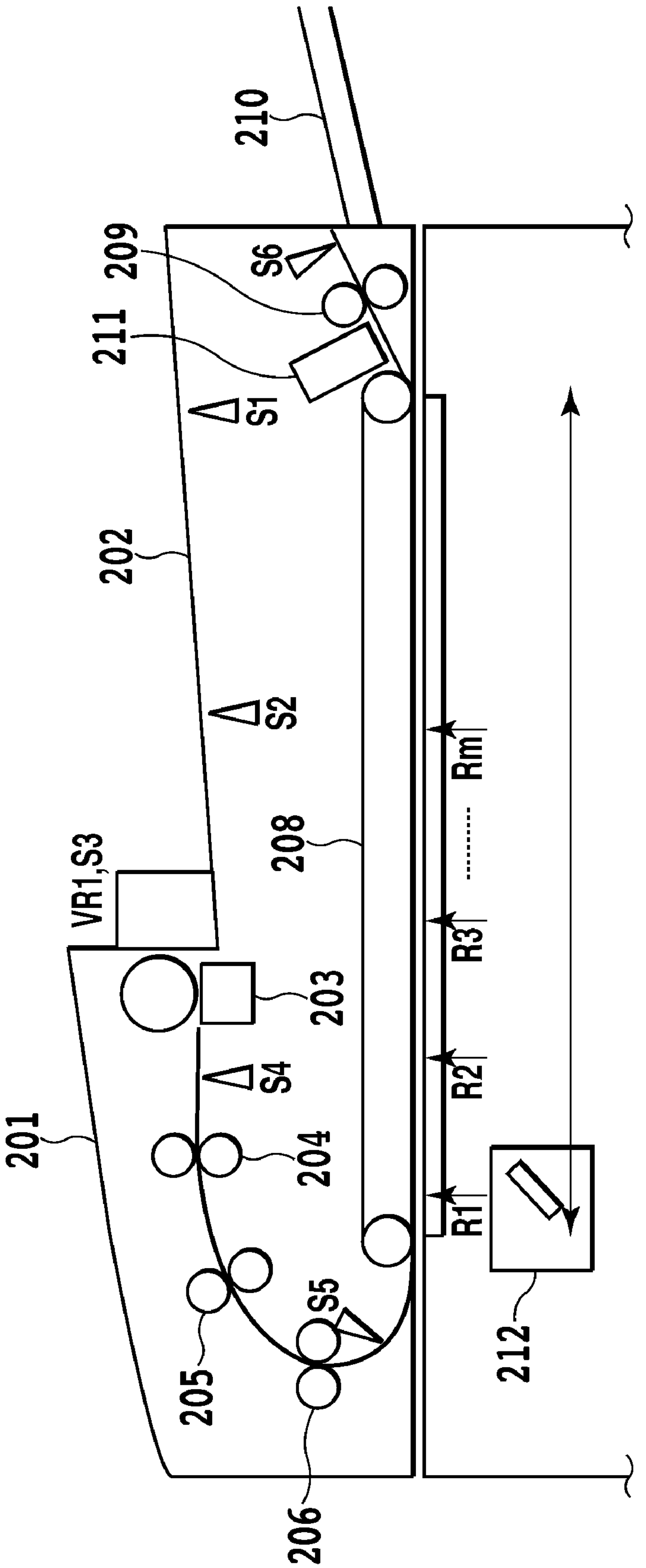
FIG. 15 is a diagram showing an exemplary configuration of a scanner.

FIG. 14 is a flowchart showing the process flow for scanning and registering paper fingerprint information in a stationary document scanning mode. In the processing shown in FIG. 14, paper fingerprint information is registered for all document sheets in the document sheaf. FIG. 15 is a diagram showing an exemplary configuration of a scanner that performs the above processing.

After correcting the skew of the leading edge of the first sheet (N=1) of the document using the resist roller 206, the CPU 251 waits until the trailing edge of the first sheet of the document reaches the lead sensor S5. In other words, the CPU 251 determines whether the lead sensor S5 has output an OFF signal (S1401).

The CPU 251 then causes the first sheet of the document to be stopped upon the document platen glass at a location Rm (m=1) of the optical unit 212 (S1402). The optical unit herein is a movable image scanning unit.

The CPU 251 then causes the optical unit 212 to scan over the location R1, thereby commencing the first scanning of paper fingerprint information (S1403).

When the first scanning of paper fingerprint information is completed, the CPU 251 resumes paper sheet conveyance, causing the document sheet to be moved and then stopped at a location Rm (m=2) (S1404).

When the document sheet stops at the location R2, the CPU 251 causes the optical unit 212 to scan, thereby commencing scanning of the paper fingerprint information at the same paper region as the paper region that was scanned for paper fingerprint information in S1403 (S1405). In other words, the CPU 251 commences the second scanning of the paper fingerprint information.

The CPU 251 then compares the paper fingerprint information scanned in the first scanning with the paper fingerprint information scanned in the second scanning (S1406).

If the two sets of paper fingerprint information are coincident, the CPU 251 registers the paper fingerprint information in the server (S1407).

If the two sets of paper fingerprint information differ, the CPU 251 resumes paper sheet conveyance, causing the document sheet to be moved to and then stopped at a location Rm (m=3). When the document sheet stops at the location Rm (m=3), the CPU 251 causes the optical unit 212 to scan, thereby commencing the third scanning of the paper fingerprint information. The CPU 251 repeats the processing from S1404 to S1406 a predetermined number of times until it is detected that the compared sets of paper fingerprint information are coincident.

Upon registering the paper fingerprint information for the first sheet, the CPU 251 determines whether there exists a second document sheet (S1408). If a second document sheet exists, the CPU 251 sets N=N+1 while additionally returning the optical unit 212 to the location R1 (S1409).

The CPU 251 then performs the processing from S1401 to S1407 again, thereby scanning and registering the paper fingerprint information for the second document sheet.

The CPU 251 performs the processing from S1407 to S1409 until the paper fingerprint information for all document sheets will be scanned and registered.

(Paper Fingerprint Information Scanning/Registration Processing in Document Feed Scanning Mode)

Figure 16:
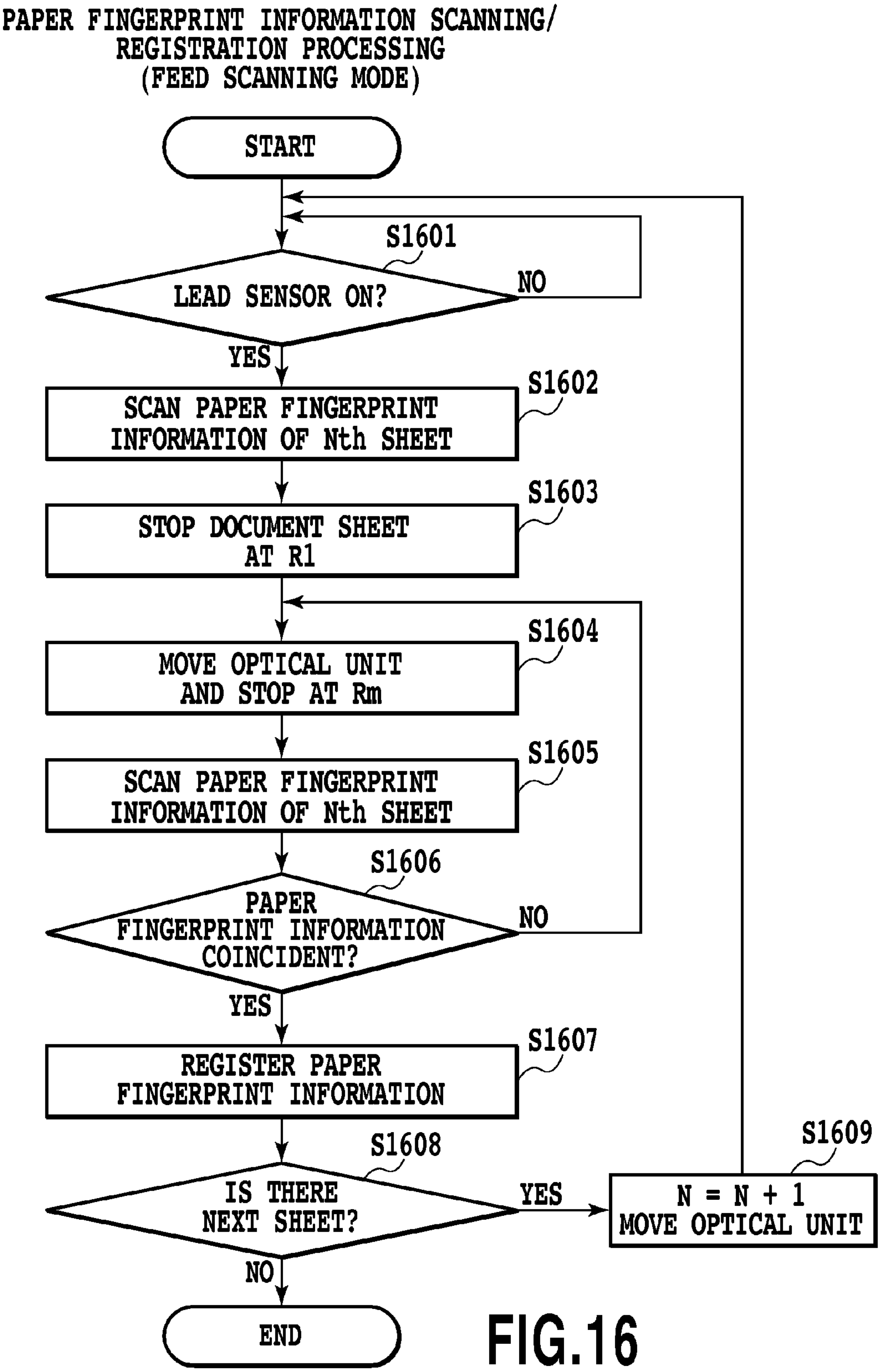
FIG. 16 is a flowchart showing a process flow for scanning paper fingerprint information in a document feed scanning mode and then registering the paper fingerprint information.

FIG. 16 is a flowchart showing the process flow for scanning and registering paper fingerprint information in a document feed scanning mode. FIG. 15 is a diagram showing an exemplary configuration of a scanner that performs the above processing.

After correcting the skew of the leading edge of first sheet (N=1) of the document using the resist roller 206, the CPU 251 waits until the leading edge of the first sheet of the document reaches the lead sensor S5. In other words, the CPU 251 determines whether the lead sensor S5 has output an ON signal (S1601).

The CPU 251 then holds the optical unit 212 in place at a location Rm (m=1), and commences scanning of paper fingerprint information while conveying the first sheet of the document (S1602).

When the first scanning of the paper fingerprint information is completed, the CPU 251 causes the document sheet to be stopped at the location Rm (m=1) (S1603).

The CPU 251 then causes the optical unit 212 to be moved and then stopped at a location Rm (m=2) (S1604).

When the optical unit 212 stops at the location Rm (m=2), the CPU 251 commences scanning of paper fingerprint information at the same paper region as the paper region that was scanned for paper fingerprint information at S1602 while conveying the document sheet (S1605). In other words, the CPU 251 commences the second scanning of the paper fingerprint information.

The CPU 251 then compares the paper fingerprint information scanned in the first scanning with the paper fingerprint information scanned in the second scanning (S1606).

If the two sets of paper fingerprint information are coincident, the CPU 251 registers the paper fingerprint information in the server (S1607).

If the two sets of paper fingerprint information differ, the CPU 251 causes the optical unit 212 to be moved again and stopped at Rm (m=3). When the optical unit 212 stops at the location Rm (m=3), the CPU 251 causes the document to be conveyed and commences the third scanning of the paper fingerprint information. The CPU 251 repeats the processing from S1604 to S1606 a predetermined number of times until it is detected that the compared sets of paper fingerprint information are coincident.

Upon registering the paper fingerprint information for the first sheet, the CPU 251 determines whether there exists a second document sheet (S1608). If a second document sheet exists, the CPU 251 sets N=N+1 while additionally returning the optical unit 212 to the location Rm (m=1) (S1609).

The CPU 251 then performs the processing from S1601 to S1607, thereby scanning and registering the paper fingerprint information for the second document sheet.

The CPU 251 performs the processing from S1607 to S1609 until the paper fingerprint information for all document sheets are scanned and registered.

(Paper fingerprint information scanning/verification processing in stationary document scanning mode)

Figure 17:
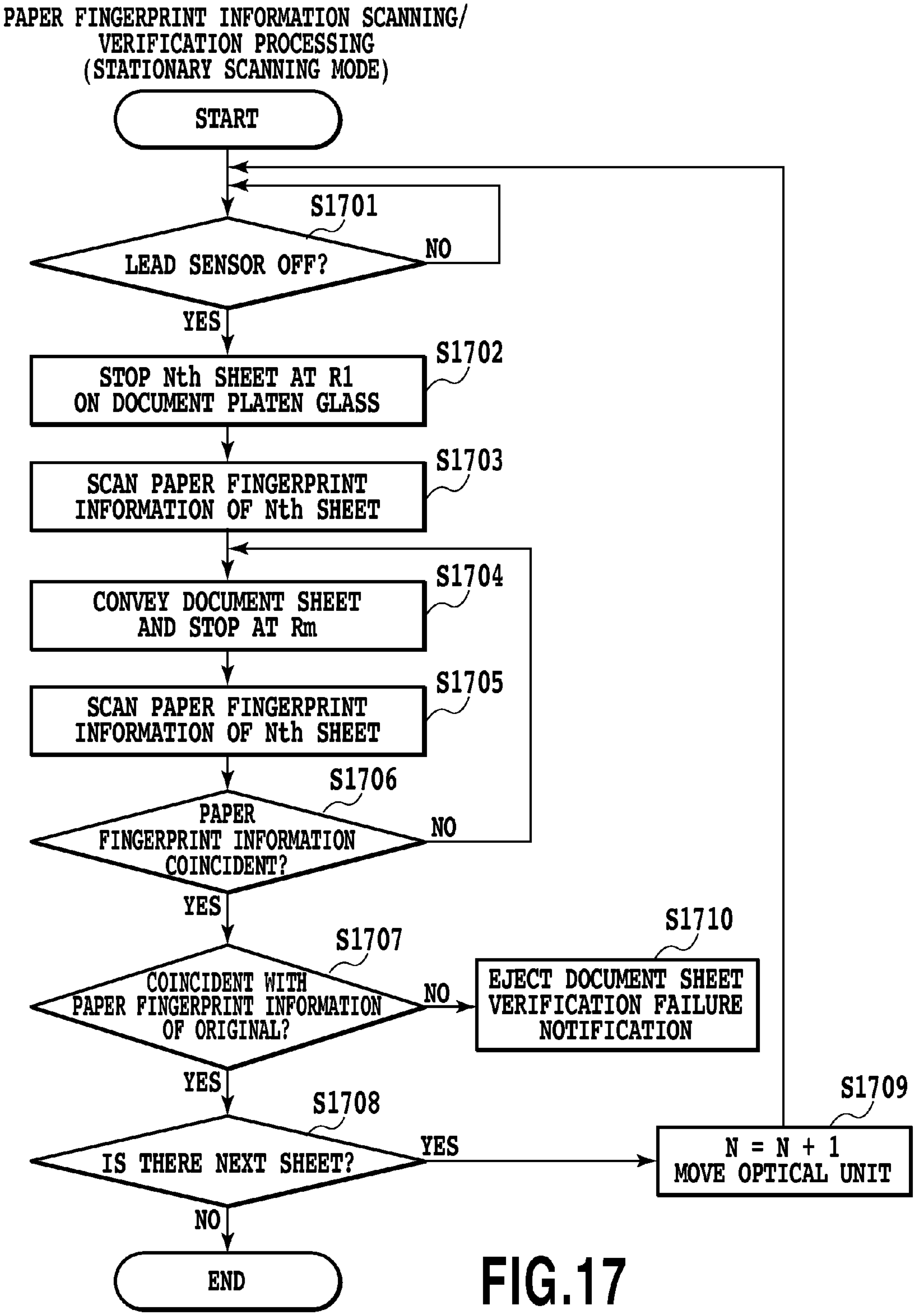
FIG. 17 is a flowchart showing a process flow for verifying paper fingerprint information in a stationary document scanning mode.

FIG. 17 is a flowchart showing the process flow for verifying paper fingerprint information in a stationary document scanning mode. In the processing shown in FIG. 17, paper fingerprint information is verified for all document sheets in the document sheaf.

After correcting the skew of the leading edge of the first sheet (N=1) of the document using the resist roller 206, the CPU 251 waits until the trailing edge of the first sheet of the document reaches the lead sensor S5. In other words, the CPU 251 determines whether the lead sensor S5 has output an OFF signal (S1701).

The CPU 251 then causes the first document sheet to be stopped upon the document platen glass at a location Rm (m=1) of the optical unit 212 (S1702).

The CPU 251 causes the optical unit 212 to scan over the location R1, thereby commencing the first scanning of the paper fingerprint information (S1703).

When the first scanning of the paper fingerprint information is completed, the CPU 251 resumes paper sheet conveyance, causing the document sheet to be moved and then stopped at a location Rm (m=2) (S1704).

When the document sheet stops at the location R2, the CPU 251 causes the optical unit 212 to scan, thereby commencing scanning of paper fingerprint information at the same paper region as the paper region that was scanned for paper fingerprint information in S1703 (S1705). In other words, the CPU 251 commences the second scanning of the paper fingerprint information.

The CPU 251 then compares the paper fingerprint information scanned in the first scanning with the paper fingerprint information scanned in the second scanning (S1706).

If the CPU 251 detects that the two sets of paper fingerprint information are coincident, then the CPU 251 stores the paper fingerprint information in the RAM 253, and the process proceeds to S1707. If the two sets of paper fingerprint information differ, the CPU 251 resumes paper sheet conveyance, causing the document sheet to be moved and then stopped at a location Rm (m=3). When the document sheet stops at the location Rm (m=3), the CPU 251 causes the optical unit 212 to scan, thereby commencing the third scanning of the paper fingerprint information. The CPU 251 repeats the processing from S1704 to S1706 a predetermined number of times until it is detected that the compared sets of paper fingerprint information are coincident.

The CPU 301 then performs verification by comparing the paper fingerprint information registered in the server to the paper fingerprint information stored in the RAM 253 (S1707).

If the two sets of paper fingerprint information are coincident in the results of the verification in S1707, the CPU 251 determines whether there exists a second document sheet (S1708). If a second document sheet exists, the CPU 251 sets N=N+1 while additionally returning the optical unit 212 to the location R1 (S1709).

The CPU 251 and the CPU 301 then perform the processing from S1701 to S1707 again, thereby verifying the paper fingerprint information for the second document sheet.

The CPU 251 and the CPU 301 perform the processing from S1707 to S1709 until paper fingerprint information will be verified for all document sheets.

If the two sets of paper fingerprint information are not coincident in the results of the verification in S1707, then the scanned document sheet is ejected, information indicating that verification has failed (a message indicating that the document differs from the original, for example) is displayed on the operation unit 12, and the process is terminated (S1710).

Figure 19:
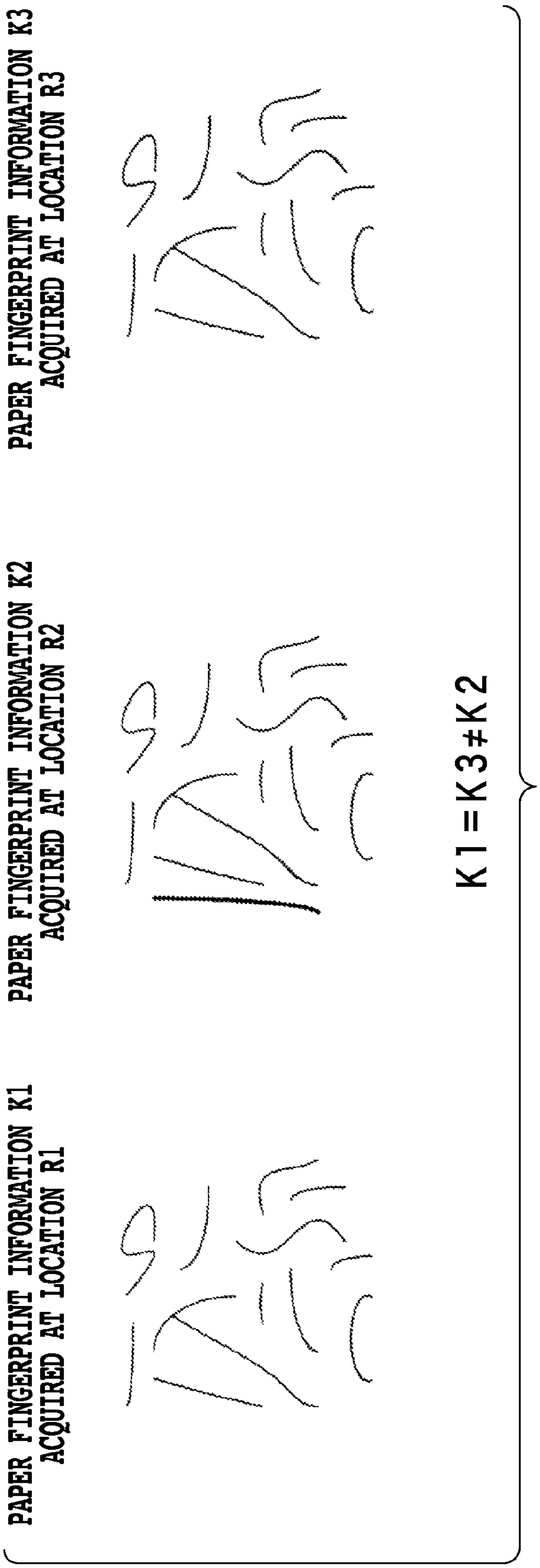
FIG. 19 is a diagram showing paper fingerprint information scanned at given locations.

FIG. 19 is a diagram illustrating paper fingerprint information K1, K2, and K3 that were respectively scanned at locations R1, R2, and R3.

FIG. 19 illustrates the case wherein the paper fingerprint information K1 scanned at the location R1 is not coincident with the paper fingerprint information K2 scanned at the location R2, but coincident with the paper fingerprint information K3 scanned at the location R3. Well-known verification methods may be used for the paper fingerprint information verification.

(Paper Fingerprint Information Scanning/Verification Processing in Document Feed Scanning Mode)

Figure 18:
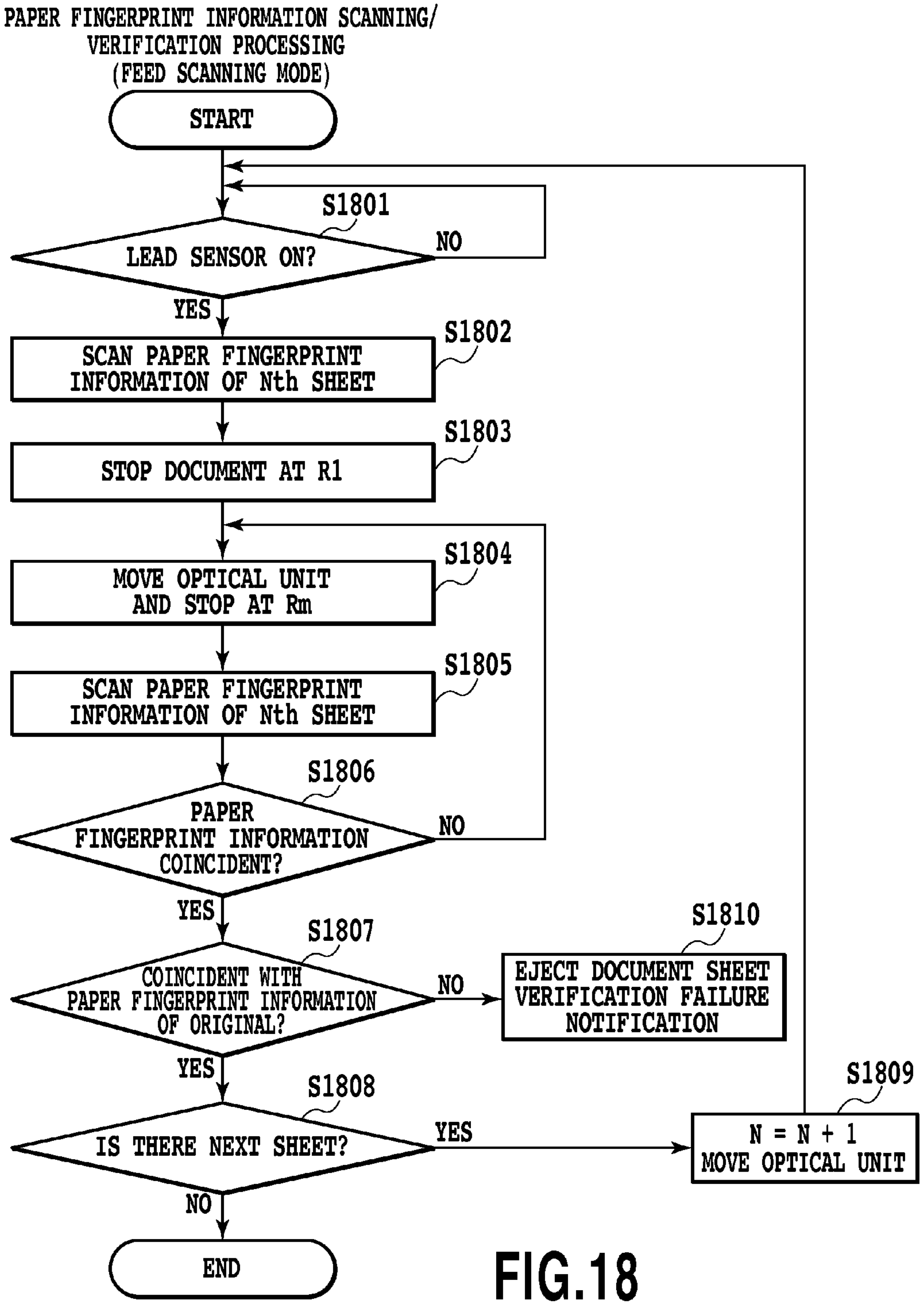
FIG. 18 is a flowchart showing a process flow for verifying paper fingerprint information in a document feed scanning mode.

FIG. 18 is a flowchart showing a process flow for verifying paper fingerprint information in a document feed scanning mode. In the processing shown in FIG. 18, paper fingerprint information is verified for all document sheets in the document sheaf.

After correcting the skew of the leading edge of the first sheet (N=1) of the document using the resist roller 206, the CPU 251 waits until the leading edge of the first sheet of the document reaches the lead sensor S5 (S1801). In other words, the CPU 251 determines whether or not the lead sensor S5 has output an ON signal (S1801).

The CPU 251 then holds the optical unit 212 in place at a location Rm (m=1), and commences scanning of paper fingerprint information while conveying the first document sheet (S1802).

When the first scanning of the paper fingerprint information is completed, the CPU 251 causes the document sheet to be stopped at a location Rm (m=1) (S1803).

The CPU 251 then causes the optical unit 212 to be moved and then stopped at a location Rm (m=2) (S1804).

When the optical unit 212 stops at the location Rm (m=2), the CPU 251 commences scanning of the paper fingerprint information at the same paper region as the paper region scanned for paper fingerprint information in S1802 while conveying the document sheet (S1805). In other words, the CPU 251 commences the second scanning of the paper fingerprint information.

The CPU 251 then compares the paper fingerprint information scanned in the first scanning with the paper fingerprint information scanned in the second scanning (S1806).

When the CPU 251 detects that the two sets of paper fingerprint information are coincident, the CPU 251 stores the paper fingerprint information in the RAM 253, and the process proceeds to S1807. If the two sets of paper fingerprint information differ, the CPU 251 causes the optical unit 212 to be moved again and stopped at a location Rm (m=3). When the optical unit 212 stops at the location Rm (m=3), the CPU 251 causes the document sheet to be conveyed, and commences the third scanning of the paper fingerprint information.

The CPU 251 repeats the processing from S1804 to S1806 a predetermined number of times until it is detected that the compared sets of paper fingerprint information are coincident.

The CPU 301 then performs verification by comparing the paper fingerprint information registered in the server to the paper fingerprint information stored in the RAM 253 (S1807).

If it is detected that the two sets of paper fingerprint information are coincident in the results of the verification in S1807, the CPU 251 determines whether there exists a second document sheet (S1808). If a second document sheet exists, the CPU 251 sets N=N+1 while additionally returning the optical unit 212 to the location R1 (S1809).

The CPU 251 and the CPU 301 then perform the processing from S1801 to S1807 again, thereby verifying the paper fingerprint information for the second document sheet.

The CPU 251 and the CPU 301 perform the processing from S1807 to S1809 until paper fingerprint information will be verified for all document sheets.

If it is not detected that the two sets of paper fingerprint information are coincident in the results of the verification in S1807, then the scanned document sheet is ejected, information indicating that verification has failed (a message indicating that the document differs from the original, for example) is displayed on the operation unit 12, and the process is terminated (S1810).

OTHER EMBODIMENTS

The present invention may also be achieved by loading, into a system or device, a recording medium that stores software program code for realizing the functions of the foregoing exemplary embodiments, wherein a computer of the system or other technology reads and then executes the program code from the recording medium. The recording medium in this case is a computer-readable recording medium. In this case, the program code itself that is read out from the recording medium realizes the functions of the foregoing exemplary embodiments, and thus the recording medium storing such program code constitutes the present invention. In addition, the functions of the foregoing exemplary embodiments may also be realized as a result of processing wherein an operating system (OS) or other software operating on the computer performs all or part of the actual processing on the basis of instructions from the program code. In addition, the foregoing exemplary embodiments may also be realized as a result of reading out the program code from the recording medium, writing the program code into a functional expansion card or functional expansion unit of the computer, and subsequently causing the functional expansion card or similar component to perform all or part of the processing on the basis of instructions from the program code.

In the case where the present invention is applied to the above recording medium, the recording medium stores program code corresponding to the flowcharts described in the foregoing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-242668, filed Sep. 19, 2007, which is hereby incorporated by reference herein in its entirety.

What is claimed is:

1. An image scanning device, comprising:

a conveying component configured to convey a document sheet placed on a document placing platen to a plurality of locations;

a scanning component configured to scan paper fingerprint information on the document sheet;

a comparing component configured to compare a first set of paper fingerprint information, which is scanned by the scanning component while holding the document sheet in place at a first location, with a second set of paper fingerprint information, which is scanned by the scanning component while holding the document sheet in place at a second location, using a matching degree comprising a value representing the degree to which the first and second sets of paper fingerprint information are similar; and an acquiring component configured to acquire the paper fingerprint information if the comparing component detects that the first set of paper fingerprint information is coincident with the second set of paper fingerprint information, wherein the matching degree is computed using an error value E(i, j) indicated by the following equation:

$$E(i, j) = \frac{\sum_{x=0,y=0}^{x=n,y=m} \alpha_1(x, y)\alpha_2(x-i, y-j)\{f_1(x, y) - f_2(x-i, y-j)\}^2}{\sum_{x=0,y=0}^{x=n,y=m} \alpha_1(x, y)\alpha_2(x-i, y-j)},$$

and wherein $f_1(x,y)$ represents grayscale image data contained in the first set of paper fingerprint information, $\alpha_1(x,y)$ represents mask data contained in the first set of paper fingerprint information, $f_2(x,y)$ represents grayscale image data contained in the second set of paper fingerprint information, and $\alpha_2(x,y)$ represents mask data contained in the second set of paper fingerprint information.

2. An image scanning device, comprising:

a conveying component configured to convey a document sheet placed on a document placing platen to a plurality of locations;

a movable scanning component configured to scan paper fingerprint information on the document sheet;

a comparing component configured to compare a first set of paper fingerprint information, which is scanned by moving the document sheet while holding the movable scanning component in place at a first location, with a second set of paper fingerprint information, which is scanned by moving the document sheet while holding the movable scanning component in place at a second location, using a matching degree comprising a value representing the degree to which the first and second sets of paper fingerprint information are similar; and an acquiring component configured to acquire the paper fingerprint information if the comparing component detects that the first set of paper fingerprint information is coincident with the second set of paper fingerprint information, wherein the matching degree is computed using an error value E(i, j) indicated by the following equation:

$$E(i,j)=\frac{\sum_{x=0,y=0}^{x=n,y=m}\alpha_1(x,y)\alpha_2(x-i,y-j)\{f_1(x,y)-f_2(x-i,y-j)\}^2}{\sum_{x=0,y=0}^{x=n,y=m}\alpha_1(x,y)\alpha_2(x-i,y-j)},$$

and wherein $f_1$(x,y) represents grayscale image data contained in the first set of paper fingerprint information, $\alpha_1$(x,y) represents mask data contained in the first set of paper fingerprint information, $f_2$(x,y) represents grayscale image data contained in the second set of paper fingerprint information, and $\alpha_2$(x,y) represents mask data contained in the second set of paper fingerprint information.

3. An image scanning device, comprising:

a conveying component configured to convey a document sheet placed on a document placing platen to a plurality of locations;

a movable scanning component configured to scan paper fingerprint information on the document sheet;

a first comparing component configured to compare a first set of paper fingerprint information, which is scanned by moving the movable scanning component while holding the document sheet in place at a first location, with a second set of paper fingerprint information, which is scanned by moving the movable scanning component while holding the document sheet in place at a second location, using a matching degree comprising a value representing the degree to which the first and second sets of paper fingerprint information are similar;

a second comparing component configured to compare a third set of paper fingerprint information, which is scanned by moving the document sheet while holding the movable scanning component in place at a third location, with a fourth set of paper fingerprint information, which is scanned by moving the document sheet while holding the movable scanning component in place at a fourth location; and an acquiring component configured to acquire the paper fingerprint information when at least one of the following conditions occurs: (i) the first comparing component detects that the first set of paper fingerprint information is coincident with the second set of paper fingerprint information, and (ii) the second comparing component detects that the third set of paper fingerprint information is coincident with the fourth set of paper fingerprint information, wherein the matching degree is computed using an error value E(i, j) indicated by the following equation:

$$E(i,j)=\frac{\sum_{x=0,y=0}^{x=n,y=m}\alpha_1(x,y)\alpha_2(x-i,y-j)\{f_1(x,y)-f_2(x-i,y-j)\}^2}{\sum_{x=0,y=0}^{x=n,y=m}\alpha_1(x,y)\alpha_2(x-i,y-j)},$$

and wherein $f_i$(x,y) represents grayscale image data contained in the first set of paper fingerprint information, $\alpha_i$(x,y) represents mask data contained in the first set of paper fingerprint information, $f_2$(x,y) represents grayscale image data contained in the second set of paper fingerprint information, and $\alpha_2$(x,y) represents mask data contained in the second set of paper fingerprint information.

4. The image scanning device of claim 1, further comprising:

a registering component configured to register the acquired paper fingerprint information in a server.

5. The image scanning device of claim 2, further comprising:

a registering component configured to register the acquired paper fingerprint information in a server.

6. The image scanning device of claim 3, further comprising:

a registering component configured to register the acquired paper fingerprint information in a server.

7. The image scanning device of claim 4, further comprising:

a verifying component configured to verify the acquired paper fingerprint information by comparison with the paper fingerprint information registered in the server.

8. The image scanning device of claim 5, further comprising:

a verifying component configured to verify the acquired paper fingerprint information by comparison with the paper fingerprint information registered in the server.

9. The image scanning device of claim 6, further comprising:

a verifying component configured to verify the acquired paper fingerprint information by comparison with the paper fingerprint information registered in the server.

10. The image scanning device of claim 7, further comprising:

a displaying component configured to display information indicating that verification has failed when the verifying component does not detect that the two sets of paper fingerprint information are coincident.

11. An image scanning method, comprising the steps of:

conveying a document sheet placed on a document placing platen to a plurality of locations;

scanning paper fingerprint information on the document sheet by a scanning component;

comparing a first set of paper fingerprint information, which is scanned by the scanning component while holding the document sheet in place at a first location, with a second set of paper fingerprint information, which is scanned by the scanning component while holding the document sheet in place at a second location, using a matching degree comprising a value representing the degree to which the first and second sets of paper fingerprint information are similar; and acquiring the paper fingerprint information if the comparison result indicates that the first set of paper fingerprint information and the second set of paper fingerprint information are coincident, wherein the matching degree is computed using an error value E(i, j) indicated by the following equation:

$$E(i,j)=\frac{\sum_{x=0,y=0}^{x=n,y=m}\alpha_1(x,y)\alpha_2(x-i,y-j)\{f_1(x,y)-f_2(x-i,y-j)\}^2}{\sum_{x=0,y=0}^{x=n,y=m}\alpha_1(x,y)\alpha_2(x-i,y-j)},$$

and wherein $f_1$(x,y) represents grayscale image data contained in the first set of paper fingerprint information, $\alpha_1(x,y)$ represents mask data contained in the first set of paper fingerprint information, $f_2(x,y)$ represents grayscale image data contained in the second set of paper fingerprint information, and $\alpha_2(x,y)$ represents mask data contained in the second set of paper fingerprint information.

12. An image scanning method, comprising the steps of:

conveying a document sheet placed on a document placing platen to a plurality of locations;

scanning paper fingerprint information on the document sheet by a movable scanning component;

comparing a first set of paper fingerprint information, which is scanned by moving the document sheet while holding the movable scanning component in place at a first location, with a second set of paper fingerprint information, which is scanned by moving the document sheet while holding the movable scanning component in place at a second location, using a matching degree comprising a value representing the degree to which the first and second sets of paper fingerprint information are similar; and acquiring the paper fingerprint information if the comparison result indicates that the first set of paper fingerprint information and the second set of paper fingerprint information are coincident, wherein the matching degree is computed using an error value E(i, j) indicated by the following equation:

$$E(i,j)=\frac{\sum_{x=0,y=0}^{x=n,y=m}\alpha_1(x,y)\alpha_2(x-i,y-j)\{f_1(x,y)-f_2(x-i,y-j)\}^2}{\sum_{x=0,y=0}^{x=n,y=m}\alpha_1(x,y)\alpha_2(x-i,y-j)},$$

and wherein $f_1(x,y)$ represents grayscale image data contained in the first set of paper fingerprint information, $\alpha_1(x,y)$ represents mask data contained in the first set of paper fingerprint information, $f_2(x,y)$ represents grayscale image data contained in the second set of paper fingerprint information, and $\alpha_2(x,y)$ represents mask data contained in the second set of paper fingerprint information.

13. An image scanning method, comprising the steps of:

conveying a document sheet placed on a document placing platen to a plurality of locations;

scanning paper fingerprint information on the document sheet by a movable scanning component;

comparing a first set of paper fingerprint information, which is scanned by moving the movable scanning component while holding the document sheet in place at a first location, with a second set of paper fingerprint information, which is scanned by moving the movable scanning component while holding the document sheet in place at a second location, using a matching degree comprising a value representing the degree to which the first and second sets of paper fingerprint information are similar;

comparing a third set of paper fingerprint information, which is scanned by moving the document sheet while holding the movable scanning component in place at a third location, with a fourth set of paper fingerprint information, which is scanned by moving the document sheet while holding the movable scanning component in place at a fourth location; and acquiring the paper fingerprint information when at least one of the following conditions is detected: (i) the first set of paper fingerprint information and the second set of paper fingerprint information are coincident, and(ii) the third set of paper fingerprint information and the fourth set of paper fingerprint information are coincident, wherein the matching degree is computed using an error value E(i, j) indicated by the following equation:

$$E(i,j)=\frac{\sum_{x=0,y=0}^{x=n,y=m}\alpha_1(x,y)\alpha_2(x-i,y-j)\{f_1(x,y)-f_2(x-i,y-j)\}^2}{\sum_{x=0,y=0}^{x=n,y=m}\alpha_1(x,y)\alpha_2(x-i,y-j)},$$

and wherein $f_1(x,y)$ represents grayscale image data contained in the first set of paper fingerprint information, $\alpha_1(x,y)$ represents mask data contained in the first set of paper fingerprint information, $f_2(x,y)$ represents grayscale image data contained in the second set of paper fingerprint information, and $\alpha_2(x,y)$ represents mask data contained in the second set of paper fingerprint information.

14. The image scanning method of claim 11, further comprising the step of:

registering the acquired paper fingerprint information in a server.

15. The image scanning method of claim 12, further comprising the step of:

registering the acquired paper fingerprint information in a server.

16. The image scanning method of claim 13, further comprising the step of:

registering the acquired paper fingerprint information in a server.

17. The image scanning method of claim 14, further comprising the step of:

verifying the acquired paper fingerprint information by comparison with the paper fingerprint information registered in the server.

18. The image scanning method of claim 15, further comprising the step of:

verifying the acquired paper fingerprint information by comparison with the paper fingerprint information registered in the server.

19. The image scanning method of claim 16, further comprising the step of:

verifying the acquired paper fingerprint information by comparison with the paper fingerprint information registered in the server.

20. The image scanning method of claim 17, further comprising the step of:

displaying information indicating that verification has failed when it is not detected that the two sets of paper fingerprint information are coincident in the verifying step.

21. A non-transitory computer-readable recording medium having computer-executable instructions for performing a method, the method comprising the steps of:

conveying a document sheet placed on a document placing platen to a plurality of locations;

scanning paper fingerprint information on the document sheet by a scanning component;

comparing a first set of paper fingerprint information, which is scanned by the scanning component while holding the document sheet in place at a first location, with a second set of paper fingerprint information, which is scanned by the scanning component while holding the document sheet in place at a second location, using a matching degree comprising a value representing the degree to which the first and second sets of paper fingerprint information are similar; and acquiring the paper fingerprint information if the comparison result indicates that the first set of paper fingerprint information and the second set of paper fingerprint information are coincident, wherein the matching degree is computed using an error value E(i, j) indicated by the following equation:

$$E(i,\ j) = \frac{\sum\limits_{x=0,y=0}^{x=n,y=m} \alpha_1(x,\ y)\alpha_2(x-i,\ y-j)\{f_1(x,\ y) - f_2(x-i,\ y-j)\}^2}{\sum\limits_{x=0,y=0}^{x=n,y=m} \alpha_1(x,\ y)\alpha_2(x-i,\ y-j)},$$

and wherein $f_1$(x,y) represents grayscale image data contained in the first set of paper fingerprint information, $\alpha_1$(x,y) represents mask data contained in the first set of paper fingerprint information, $f_2$(x,y) represents grayscale image data contained in the second set of paper fingerprint information, and $\alpha_2$(x,y) represents mask data contained in the second set of paper fingerprint information.

22. A non-transitory computer-readable recording medium having computer-executable instructions for performing a method, the method comprising the steps of:

conveying a document sheet placed on a document placing platen to a plurality of locations;

scanning paper fingerprint information on the document sheet by a movable scanning component;

comparing a first set of paper fingerprint information, which is scanned by moving the document sheet while holding the movable scanning component in place at a first location, with a second set of paper fingerprint information, which is scanned by moving the document sheet while holding the movable scanning component in place at a second location, using matching degree comprising a value representing the degree to which the first and second sets of paper fingerprint information are similar; and acquiring the paper fingerprint information if the comparison result indicates that the first set of paper fingerprint information and the second set of paper fingerprint information are coincident, wherein the matching degree is computed using an error value E(i, j) indicated by the following equation:

$$E(i,\ j) = \frac{\sum\limits_{x=0,y=0}^{x=n,y=m} \alpha_1(x,\ y)\alpha_2(x-i,\ y-j)\{f_1(x,\ y) - f_2(x-i,\ y-j)\}^2}{\sum\limits_{x=0,y=0}^{x=n,y=m} \alpha_1(x,\ y)\alpha_2(x-i,\ y-j)},$$

and wherein $f_1$(x,y) represents grayscale image data contained in the first set of paper fingerprint information $\alpha_i$(x,y) represents mask data contained in the first set of paper fingerprint information, $f_2$(x,y) represents grayscale image data contained in the second set of paper fingerprint information, and $\alpha_2$(x,y) represents mask data contained in the second set of paper fingerprint information.

23. A non-transitory computer-readable recording medium having computer-executable instructions for performing a method, the method comprising the steps of:

conveying a document sheet placed on a document placing platen to a plurality of locations;

scanning paper fingerprint information on the document sheet by a movable scanning component;

comparing a first set of paper fingerprint information, which is scanned by moving the movable scanning component while holding the document sheet in place at a first location, with a second set of paper fingerprint information, which is scanned by moving the movable scanning component while holding the document sheet in place at a second location, using a matching degree comprising a value representing the degree to which the first and second sets of paper fingerprint information are similar;

comparing a third set of paper fingerprint information, which is scanned by moving the document sheet while holding the movable scanning component in place at a third location, with a fourth set of paper fingerprint information, which is scanned by moving the document sheet while holding the scanning component in place at a fourth location; and acquiring the paper fingerprint information when at least one of the following conditions is detected: (i) the first set of paper fingerprint information and the second set of paper fingerprint information are coincident, and(ii) the third set of paper fingerprint information and the fourth set of paper fingerprint information are coincident, wherein the matching degree is computed using an error value E(i, j) indicated by the following equation:

$$E(i,\ j) = \frac{\sum\limits_{x=0,y=0}^{x=n,y=m} \alpha_1(x,\ y)\alpha_2(x-i,\ y-j)\{f_1(x,\ y) - f_2(x-i,\ y-j)\}^2}{\sum\limits_{x=0,y=0}^{x=n,y=m} \alpha_1(x,\ y)\alpha_2(x-i,\ y-j)},$$

and wherein $f_1$(x,y) represents grayscale image data contained in the first set of paper fingerprint information, $\alpha_1$(x,y) represents mask data contained in the first set of paper fingerprint information, $f_2$(x,y) represents grayscale image data contained in the second set of paper fingerprint information, and $\alpha_2$(x,y) represents mask data contained in the second set of paper fingerprint information.

* * * * *